(12) United States Patent
Nishibayashi et al.

(10) Patent No.: US 8,732,257 B2
(45) Date of Patent: May 20, 2014

(54) SERVER APPARATUS, TERMINAL APPARATUS, AND COMMUNICATION CONTROL METHOD

(75) Inventors: Yasuyuki Nishibayashi, Kawasaki (JP); Masataka Goto, Yokohama (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 204 days.

(21) Appl. No.: 12/201,438

(22) Filed: Aug. 29, 2008

(65) Prior Publication Data

US 2009/0077192 A1 Mar. 19, 2009

(30) Foreign Application Priority Data

Aug. 31, 2007 (JP) ................. P2007-226990

(51) Int. Cl.
*G06F 15/16* (2006.01)
*G06F 13/00* (2006.01)
(52) U.S. Cl.
USPC ........................................ 709/207; 345/536
(58) Field of Classification Search
USPC ................ 713/171, 201; 709/204, 203, 207
See application file for complete search history.

(56) References Cited

U.S. PATENT DOCUMENTS

| | | | | |
|---|---|---|---|---|
| 5,708,909 | A | * | 1/1998 | Yamashita et al. ................. 399/8 |
| 5,860,022 | A | * | 1/1999 | Kondou et al. ..................... 710/1 |
| 6,501,421 | B1 | * | 12/2002 | Dutta et al. .............. 342/357.22 |
| 6,681,345 | B1 | * | 1/2004 | Storino et al. ................... 714/42 |
| 6,718,479 | B1 | * | 4/2004 | Christenson ................... 713/502 |
| 6,754,695 | B2 | * | 6/2004 | Kuroshima .................... 709/210 |
| 6,763,226 | B1 | * | 7/2004 | McZeal, Jr. ................. 455/90.2 |
| 6,784,855 | B2 | | 8/2004 | Matthews et al. |
| 6,810,421 | B1 | * | 10/2004 | Ishizaki et al. ................. 709/226 |
| 7,397,476 | B2 | * | 7/2008 | Akaiwa et al. ................. 345/536 |
| 7,441,117 | B2 | * | 10/2008 | Matsuzaki et al. ............. 713/163 |
| 7,554,992 | B2 | * | 6/2009 | Kimura et al. ................. 370/400 |
| 7,558,264 | B1 | * | 7/2009 | Lolayekar et al. ............. 370/392 |
| 7,757,075 | B2 | * | 7/2010 | DeTreville ..................... 713/155 |
| 7,852,832 | B1 | * | 12/2010 | Croak et al. .................... 370/352 |
| 2002/0007374 | A1 | * | 1/2002 | Marks et al. ................... 707/513 |
| 2002/0087719 | A1 | * | 7/2002 | Katoh et al. ................... 709/237 |
| 2002/0091834 | A1 | * | 7/2002 | Isozu et al. .................... 709/227 |
| 2002/0099884 | A1 | * | 7/2002 | Chang et al. .................... 710/62 |
| 2003/0005080 | A1 | * | 1/2003 | Watkins et al. ................ 709/218 |
| 2003/0014477 | A1 | * | 1/2003 | Oppenheimer et al. ....... 709/203 |

(Continued)

FOREIGN PATENT DOCUMENTS

JP 2007-4656 1/2007

*Primary Examiner* — Tamara T Kyle
*Assistant Examiner* — Margishi Desai
(74) *Attorney, Agent, or Firm* — Oblon, Spivak, McClelland, Maier & Neustadt, L.L.P.

(57) ABSTRACT

A server apparatus for establishing communication with a plurality of input/output devices via a network. The apparatus includes: a management unit configured to manage a communication session with the input/output devices; a storage unit configured to store information of the input/output devices in association with group information thereof; an execution unit configured to execute an application program; a communication unit configured to receive an operation instruction for the application program and to transmit to the input/output devices a processing result of the application program; a determination unit configured to determine whether the processing result requires connection of the input/output devices to an external server; and a message transmission unit configured to generate a message including an instruction to connect to the external server, when the determination unit determines that the processing results requires such a connection. The message includes the group information.

6 Claims, 19 Drawing Sheets

(56) References Cited

U.S. PATENT DOCUMENTS

| | | | |
|---|---|---|---|
| 2003/0040932 A1* | 2/2003 | Sato | 705/1 |
| 2003/0041110 A1* | 2/2003 | Wenocur et al. | 709/206 |
| 2003/0079018 A1* | 4/2003 | Lolayekar et al. | 709/226 |
| 2003/0105820 A1* | 6/2003 | Haims et al. | 709/205 |
| 2003/0115255 A1* | 6/2003 | Kuroshima | 709/203 |
| 2004/0093523 A1* | 5/2004 | Matsuzaki et al. | 713/201 |
| 2004/0098664 A1* | 5/2004 | Adelman et al. | 715/500 |
| 2004/0152439 A1* | 8/2004 | Kimura et al. | 455/403 |
| 2005/0043060 A1* | 2/2005 | Brandenberg et al. | 455/558 |
| 2005/0086501 A1* | 4/2005 | Woo et al. | 713/189 |
| 2005/0267961 A1* | 12/2005 | Pirbhai et al. | 709/223 |
| 2006/0047960 A1* | 3/2006 | Ono et al. | 713/171 |
| 2006/0075247 A1* | 4/2006 | Stevens | 713/178 |
| 2006/0107039 A1* | 5/2006 | Sugiura et al. | 713/156 |
| 2006/0165074 A1* | 7/2006 | Modi et al. | 370/389 |
| 2006/0173997 A1* | 8/2006 | Tullberg et al. | 709/224 |
| 2006/0215656 A1* | 9/2006 | Shirogane | 370/389 |
| 2006/0253205 A1* | 11/2006 | Gardiner | 700/19 |
| 2006/0265458 A1* | 11/2006 | Aldrich et al. | 709/206 |
| 2006/0279627 A1* | 12/2006 | Yamamoto et al. | 348/14.14 |
| 2007/0005693 A1* | 1/2007 | Sampath et al. | 709/204 |
| 2007/0047845 A1* | 3/2007 | Aoki et al. | 382/305 |
| 2007/0060361 A1* | 3/2007 | Nguyen et al. | 463/42 |
| 2007/0101082 A1* | 5/2007 | Sugiura et al. | 711/165 |
| 2007/0147299 A1* | 6/2007 | Ando et al. | 370/331 |
| 2007/0214224 A1* | 9/2007 | Nam et al. | 709/206 |
| 2007/0274525 A1* | 11/2007 | Takata et al. | 380/270 |
| 2008/0049651 A1* | 2/2008 | Chang et al. | 370/310 |
| 2008/0086564 A1* | 4/2008 | Putman et al. | 709/227 |
| 2008/0098081 A1* | 4/2008 | Noda et al. | 709/208 |
| 2008/0148260 A1* | 6/2008 | Morita | 718/101 |
| 2008/0183811 A1* | 7/2008 | Kotras et al. | 709/203 |
| 2008/0301795 A1* | 12/2008 | Lee et al. | 726/11 |
| 2009/0007152 A1* | 1/2009 | Cahill et al. | 719/321 |
| 2009/0240849 A1* | 9/2009 | Corneli et al. | 710/38 |
| 2010/0115106 A1* | 5/2010 | Moriwaki et al. | 709/227 |

* cited by examiner

FIG. 5

| SELF-IP-ADDRESS | SELF-PORT-NUMBER | IP-ADDRESS OF DEVICE TERMINAL | PORT NUMBER OF DEVICE TERMINAL | TYPE | UNIQUE INFORMATION | SESSION IDENTIFIER |
|---|---|---|---|---|---|---|
| 10.0.0.1 | 1000 | 192.168.0.1 | 50000 | KEYBOARD | CONNECTION SPEED DISPLAY INTERVAL | 7AB3925D3Z4 |
| 10.0.0.1 | 1001 | 192.168.0.2 | 50000 | MOUSE | CONNECTION SPEED CURSOR SPEED | 7AB3925D3Z4 |
| 10.0.0.1 | 1002 | 192.168.0.3 | 50000 | DISPLAY | CONNECTION SPEED IMAGE QUALITY RESOLUTION SCREEN SIZE | 7AB3925D3Z4 |

FIG. 6

| IP HEADER | UDP/TCP HEADER | MESSAGE TYPE (TRANSFER INSTRUCTION) | IP ADDRESS OF TRANSFER TARGET | PORT NUMBER OF TRANSFER TARGET | SESSION IDENTIFIER | UNIQUE INFORMATION |
|---|---|---|---|---|---|---|

FIG. 9A

| SELF-IP-ADDRESS | SELF-PORT-NUMBER | IP ADDRESS OF SERVER | PORT NUMBER OF SERVER | TYPE | UNIQUE INFORMATION |
|---|---|---|---|---|---|
| 192.168.0.1 | 50000 | 10.0.0.1 | 1000 | KEYBOARD | CONNECTION SPEED DISPLAY INTERVAL |

FIG. 9B

| SELF-IP-ADDRESS | SELF-PORT-NUMBER | IP ADDRESS OF SERVER | PORT NUMBER OF SERVER | TYPE | UNIQUE INFORMATION |
|---|---|---|---|---|---|
| 192.168.0.2 | 50000 | 10.0.0.1 | 1001 | MOUSE | CONNECTION SPEED CURSOR SPEED |

FIG. 9C

| SELF-IP-ADDRESS | SELF-PORT-NUMBER | IP ADDRESS OF SERVER | PORT NUMBER OF SERVER | TYPE | UNIQUE INFORMATION |
|---|---|---|---|---|---|
| 192.168.0.3 | 50000 | 10.0.0.1 | 1002 | DISPLAY | CONNECTION SPEED IMAGE QUALITY RESOLUTION SCREEN SIZE |

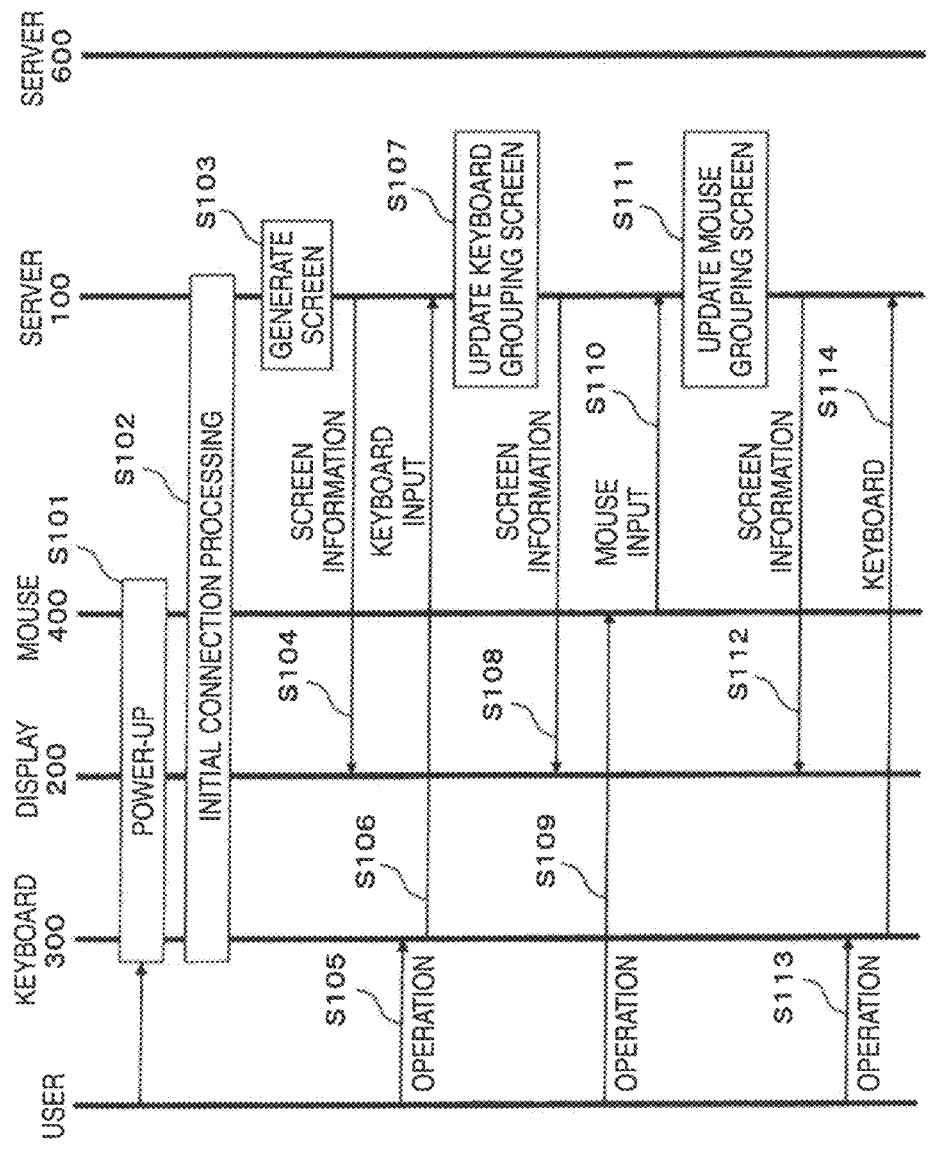

FIG. 15A

| SELF-IP-ADDRESS | SELF-PORT-NUMBER | IP ADDRESS OF SERVER | PORT NUMBER OF SERVER | TYPE | UNIQUE INFORMATION |
|---|---|---|---|---|---|
| 192.168.0.3 | 50000 | 10.0.0.1 | 1002 | DISPLAY | SCREEN SIZE (0,0, 511,767) |
| 192.168.0.3 | 50000 | 10.0.0.2 | 1002 | DISPLAY | SCREEN SIZE (512,0, 1023,767) |

FIG. 15B

| SELF-IP-ADDRESS | SELF-PORT-NUMBER | IP ADDRESS OF SERVER | PORT NUMBER OF SERVER | TYPE | UNIQUE INFORMATION |
|---|---|---|---|---|---|
| 192.168.0.2 | 50000 | 10.0.0.1 | 1001 | MOUSE | CONNECTION SPEED CURSOR SPEED |

FIG. 17

| IP HEADER | UDP/TCP HEADER | MESSAGE TYPE (ADDITION INSTRUCTION) | IP ADDRESS OF ADDITION TARGET | PORT NUMBER OF ADDITION TARGET | SESSION IDENTIFIER | UNIQUE INFORMATION |

FIG. 18

| IP HEADER | UDP/TCP HEADER | MESSAGE TYPE (ADDITION COMPLETION) | UNIQUE INFORMATION |

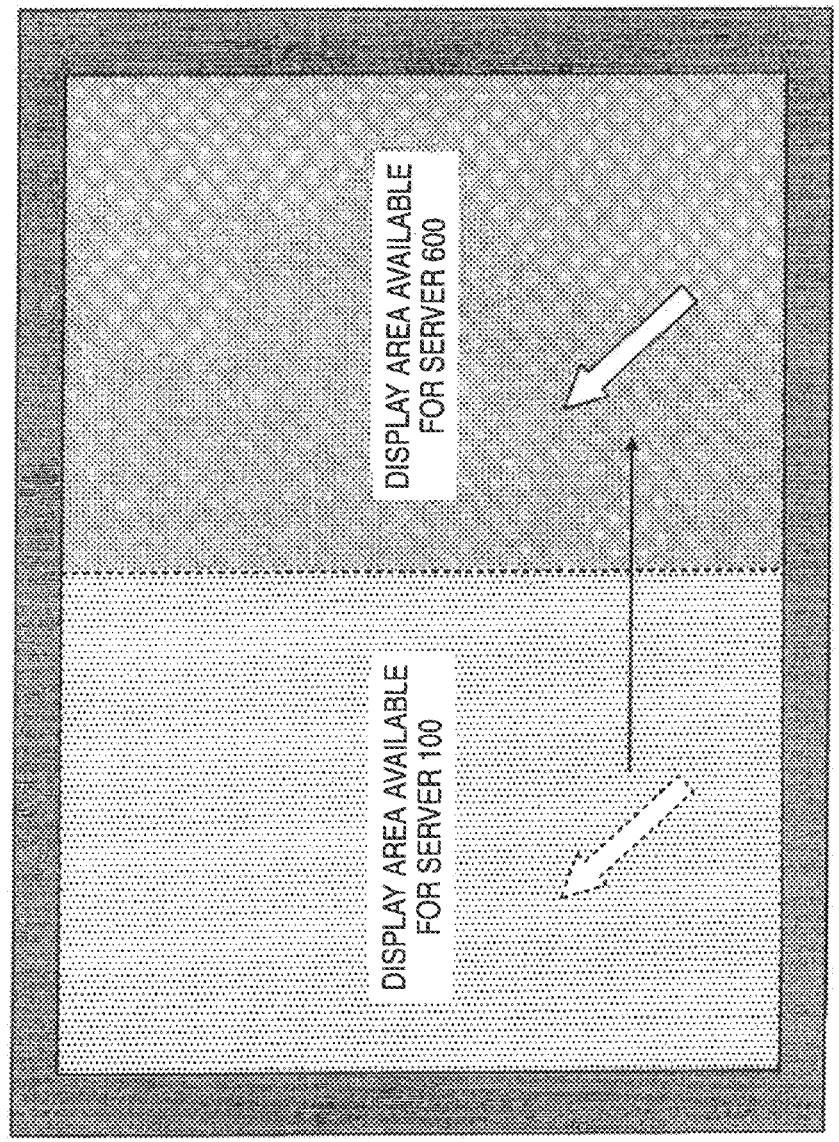

FIG. 21A

| IP HEADER | UDP/TCP HEADER | MESSAGE TYPE (SERVER ACQUISITION INFORMATION) | COORDINATE POSITION INFORMATION |
|---|---|---|---|

FIG. 21B

| IP HEADER | UDP/TCP HEADER | MESSAGE TYPE (SERVER INFORMATION ANSWER) | IP ADDRESS | PORT NUMBER |
|---|---|---|---|---|

SERVER APPARATUS, TERMINAL APPARATUS, AND COMMUNICATION CONTROL METHOD

CROSS-REFERENCE TO RELATED APPLICATIONS

This application is based upon and claims the benefit of priority from Japanese Patent Application No. 2007-226990, filed Aug. 31, 2007, the entire contents of which are incorporated herein by reference.

BACKGROUND

1. Field

An aspect of the invention relates to a server apparatus, a terminal apparatus, and a communication control method, for utilizing an application function on the server apparatus through use of a plurality of input/output devices.

2. Description of Related Art

For the purpose of improving usability, there is known a computing system in which a terminal with a minimum input/output interface is performed at user's side and complicated calculations are done via by a server on a network at a remote location. For instance, U.S. Pat. No. 6,784,855 discloses a computing system in which a main unit (a personal computer, a server, and the like) runs an application to create screen image to be transmitted and shown on a display terminal at user's side through the network.

In the computing system disclosed in U.S. Pat. No. 6,784,855, the display terminal with a touch panel at a user's side connects directly to the server through the network, to thus establish communication. When input/output devices other than the display terminal, such as a mouse, a keyboard, and a speaker, use the application program and the processing power of the server, all these devices have to establish communication with the server via the display terminal. Therefore, when such a computing system is implemented, the display terminal has to maintain multiple interfaces to connect with various input/output devices, which causes complication of the configuration of the terminal.

In contrast, there has also been proposed a computing system in which input/output devices, such as a mouse, a keyboard, and a speaker, as well as a display terminal are connected directly to a server, to establish communication (see; for instance, JP-A-2007-4656).

In such a computing system in which a plurality of input/output devices are independently connected to the server, to establish communication, when a plurality of users use one server, input/output devices need to be grouped and managed on a per-user basis. In order to implement such grouping and management, JP-A-2007-4656 discloses a technique for grouping input/output devices which has a capability to access the network.

According to the technique described in JP-A-2007-4656, the display terminal first attempts to establish connection with a server. When the server authenticates the display terminal as a device to be trusted, the input device, such as a mouse and a keyboard, next attempts to establish a connection. When such an attempt to establish a connection is performed by the input device, the server displays, on the already-connected display terminal, a screen for prompting interactive operation with the input device that is attempting to make a connection. When the user performs an operation for the input device in response to the screen, the server determines whether or not input information coincides with an expected response. When a match exists, the input device is taken as equipment belonging to a same group of the user who owns the display terminal, to thus performing grouping. Thus, the input/output devices are grouped on a per-user basis.

However, in a case where connections are necessary to a plurality of servers in order to utilize a plurality of applications, the grouping procedures which are caused every time devices try to establish connections with a server degrade the usability.

SUMMARY OF THE INVENTION

As mentioned above, in a computing system that uses an application program and a processing power of servers connected to a network with input/output devices, when the switching procedure from a current server to a new server must be performed every time, and a problem of degradation of usability will arise under the method for grouping the input/output devices by interactive communication between the servers and the user.

The invention may provide a server apparatus for establishing communication with a plurality of input/output devices via a network, the apparatus including: a management unit configured to establish and manage a communication session with each of the input/output devices; a storage unit configured to store information of the plurality of input/output devices in association with information of a group to which the input/output devices belong; an execution unit configured to execute an application program; a communication unit configured to receive from the plurality of input/output devices an input operation for the application program and to transmit to the plurality of input/output devices a processing result of the application program; a determination unit configured to determine whether the processing result requires connection of the plurality of input/output devices to an external server, and a message transmission unit configured to generate a message for instructing the plurality of input/output devices to connect to the external server, when the determination unit determines that the processing results requires connection of the plurality of input/output devices with the external server; wherein the message includes information about the group.

The invention may provide a terminal apparatus for establishing communication with servers on a network, the apparatus including: a managing unit configured to manage a communication session with a first server; a transmitting unit configured to transmit an operation instruction to the application program that runs on the first server; a receiving unit configured to receive a message including a group information about a group to which the terminal belongs and an instruction to connect to a second server; and an establishing unit configured to establish a communication session by making a connection with the second server so that the group information is provided to the second server.

The invention may provide a communication control method of a server apparatus for establishing communication with a plurality of input/output devices via a network and for running an application program, the method including: establishing and managing a communication session with each of the input/output devices; storing information of the plurality of input/output devices in association with information of a group to which the input/output devices belong; receiving from the plurality of input/output devices an input operation for the application program; transmitting to the plurality of input/output devices a processing result of the application program; determining whether the processing result requires connection of the plurality of input/output devices to an external server; and generating a message for instructing the plurality of input/output devices to connect to the external server, when it is determined that the processing results requires connection of the plurality of input/output devices with the external server; wherein the message includes information about the group.

BRIEF DESCRIPTION OF THE SEVERAL VIEWS OF THE DRAWINGS

Embodiment may be described in detail with reference to the accompanying drawings, in which:

FIG. 5 is a view showing an example communication session information table of the first embodiment;

FIG. 6 is a view showing an example configuration of a transfer instruction message of the first embodiment;

FIGS. 9A-C are views showing an example communication session information table of the first embodiment;

FIG. 10 is a sequence diagram showing operation of the computing system of the first embodiment;

FIGS. 15A and B are views showing an example communication session information table of the second embodiment;

FIG. 17 is an example of view showing an organization of an addition instruction message of the second embodiment;

FIG. 18 is a view showing an example configuration of an addition completion message of the second embodiment;

FIG. 20 is a view showing an example display of the display of the second embodiment; and FIGS. 21A and B are views showing an example configuration of a server information acquisition message and an example configuration of a server information answer message of the second embodiment.

DETAILED DESCRIPTION

Embodiments of the present invention will be described hereunder.

First Embodiment

Figure 2:
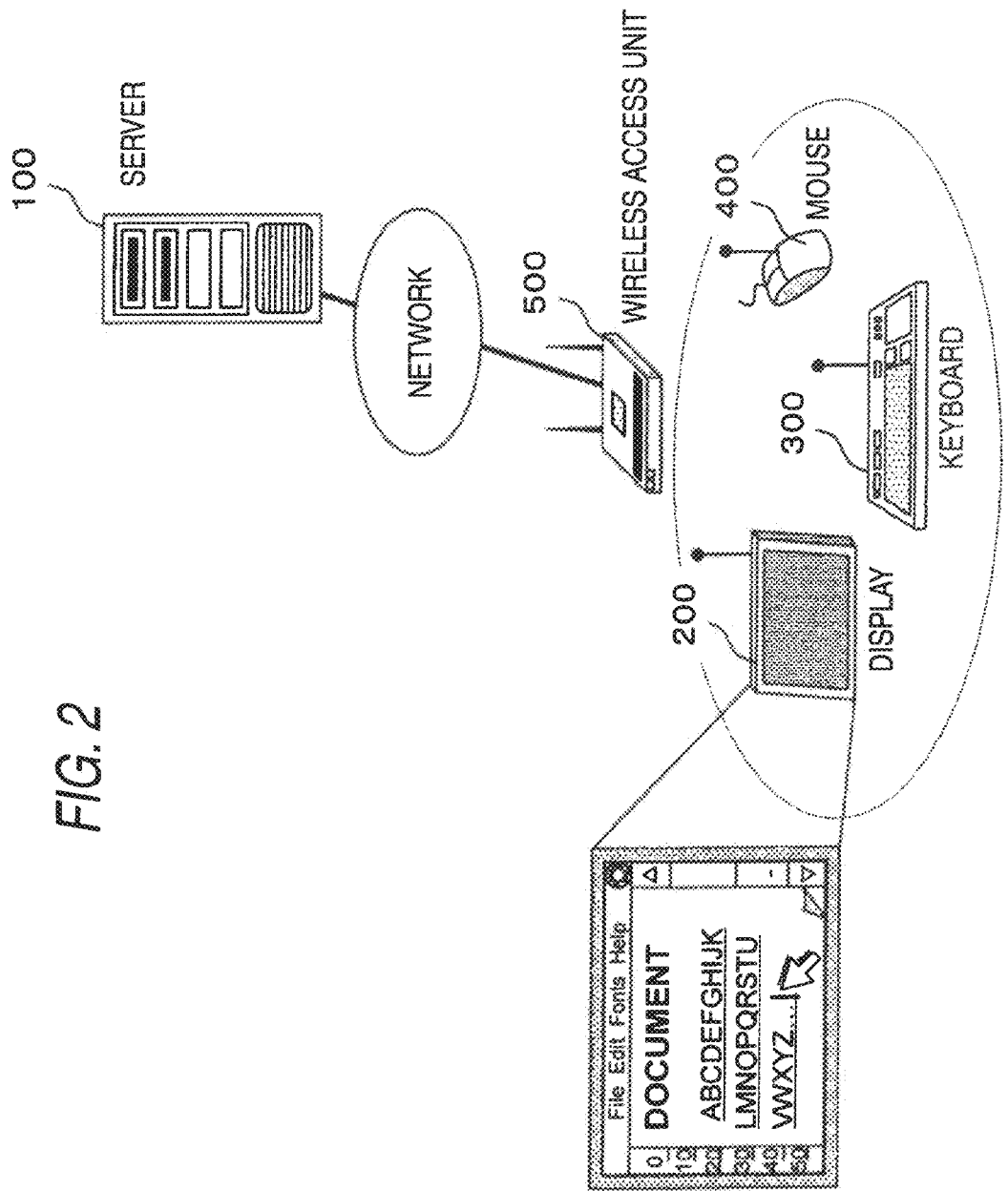
FIG. 2 is a schematic view showing an organization of a computing system of the first embodiment.

FIG. 2 is a view showing an example organization of a computing system of the present invention including a server 100, a server 600, and terminals (a display 200, a keyboard 300, and a mouse 400) acting as input/output devices.

In addition to having a basic function as an input/output device (a display function for the display, a key input processing function for the keyboard, and an input processing function of movement of a pointer for the mouse), the display 200, the keyboard 300, and the mouse 400 each have a communication function for establishing communication with another communication devices.

In FIG. 2, each of these input/output devices has a communication function implemented by a wireless LAN and establishes a connection with the server 100 on the network via a wireless access unit 500. In the computing system of the present invention, communication means interaction between the input/output device and the server, and the transmission process can be performed by both wireless and wired communication.

The server 100 groups the input/output devices and manages the groups, thereby enabling appropriate determination of an output device that is to output a processing result in response to an input from the input device.

For instance, when the input/output devices have high-performance processing capability, autonomous exchange of user information and identification information about equipment is performed between the server 100 and the input/output devices and among the input/output devices, so that the respective devices grasp a group to which the devices belong. Thereby, initial grouping of the input/output devices can be realized.

However, when such processing is performed, the configuration of the input/output device becomes complicate. Further, an increase in processing load may cause a problem of an increase in power consumption. Particularly, as shown in FIG. 2, when the input/output device is used as a mobile terminal an increase in power consumption from an increase in communication load undesirably leads to degradation of a drive time of a mobile terminal.

In contrast, input/output devices can also be grouped by use of interactive operation performed between the server 100 and the user (the input/output device) as described in; for instance, JP-A-2007-4656. Under such a method, the server 100 establishes communication with the appropriate input/output devices, and the server 100 mainly performs grouping of the input/output devices and management of the thus-grouped devices, so that the device configuration of each of the input/output devices can be simplified. Further, the essential requirement for the input/output devices is to establish only communication with the server 100. Hence, communication load on the input/output devices is reduced, so that a superior lower power consumption characteristic can be realized.

Operation of the computing system shown in FIG. 2 will now be briefly described.

In FIG. 2, the user uses an application function of the server 100 by use of the input/output devices (the display 200, the keyboard 300, and the mouse 400) disposed at the user.

Specifically, when the user performs input processing in relation to the keyboard 300 and the mouse 400 (i.e., key input, movement of the mouse, clicking, and the like), the keyboard 300 and the mouse 400 received the input transmits input information to the server 100. The server 100 receives the input information transmitted from the input devices and performs application processing responsive to the input.

FIG. 2 shows an embodiment where the server 100 has a word processing application function. An application screen transmitted from the server 100 is displayed on the display 200.

When the user performs an entry by way of the keyboard 300, key input information is transmitted to the server 100. In accordance with received key input information, the server 100 performs application processing, thereby generating an application screen reflecting a processing result and transmitting the thus-generated screen to the display 200. The display 200 displays the application screen newly received from the server 100.

Transmission of the application screen from the server 100 to the display 200 is to be performed by use of a transmission scheme, such as VNC (Virtual Network Computing). According to VNC, when updating of the application screen generated by the server 100 happens, a value of pixel information about an application screen achieved before an update and a value of pixel information about an updated application screen are compared with each other, thereby extracting a screen area changed before and after an update, and only difference information about that screen area is transmitted. However, when; for example, a large change in application screen, such as movement of a window, difference information to be transmitted becomes great. However, in the case of an input of a small change in application screen, such as movement of a mouse pointer, difference information to be transmitted is small, and hence efficient utilization of a communication band becomes feasible.

As mentioned above, the server 100 is arranged so as to group input/output devices on a per-user basis by means of interactive operation performed between the server 100 and the input/output devices. As a result, even when a service is provided by making a connection with a plurality of users, the server 100 can provide a service while individually distinguishing the input/output devices belonging to the respective users.

Operation performed when the group of input/output devices remaining in connection with a certain server A (the server 100) is switched to another server B (the server 600) will now be described by reference to FIGS. 3 and 4.

Figure 3:
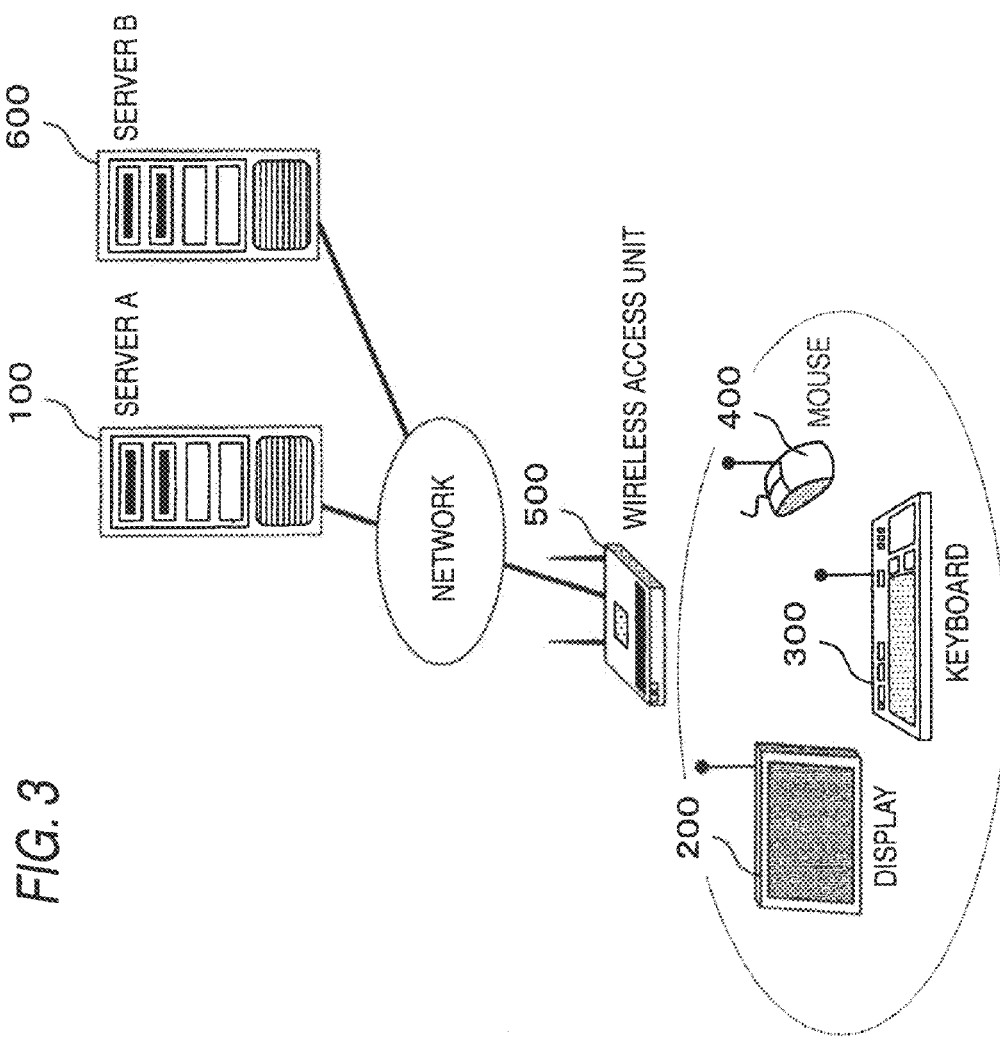
FIG. 3 is a schematic view showing an organization of a computing system of the first embodiment.

In FIG. 3, the server 100 is assumed to have a "word processing" function, and the server 600 is assumed to have a "spreadsheet" function. The server 100 is assumed to have gathered in advance the presence of the server 600 and a service that can be provided by the server 600. A technical specification; for instance, UPnP (Universal Plug and Play), and the like, can be used for gathering a service that can be provided by another server.

First, the display 200, the keyboard 300, and the mouse 400 are assumed to be managed as a single group by the server 100, and the server 100 is assumed to provide a word processing function to the user.

Figure 4:
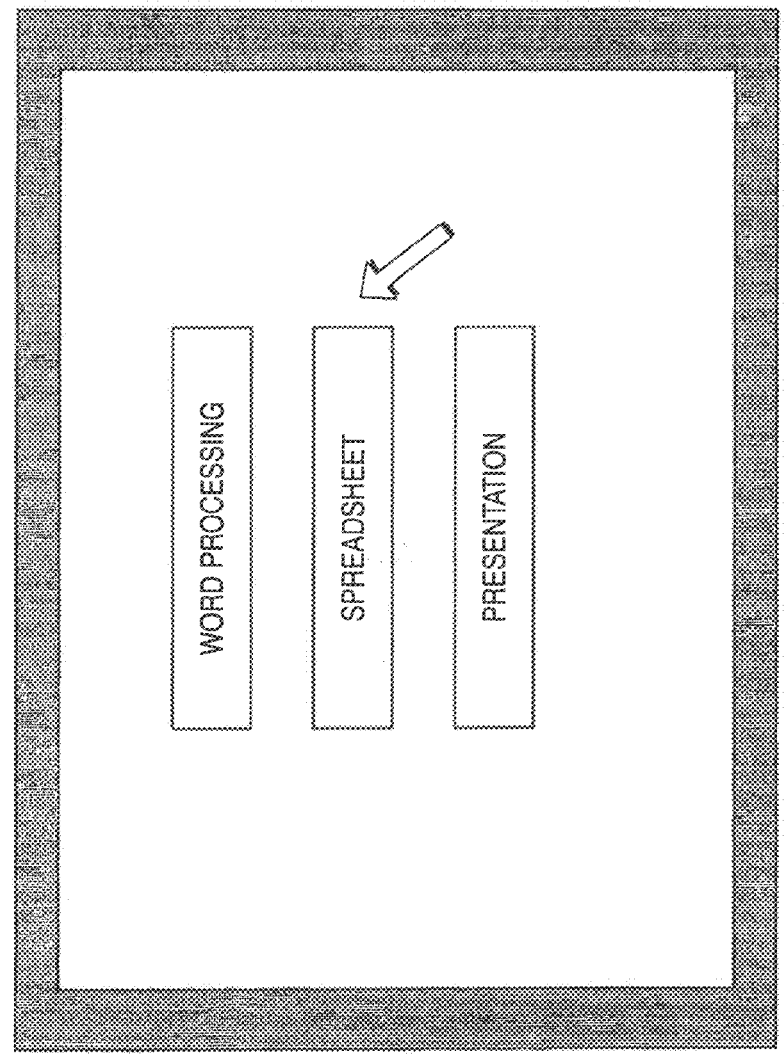
FIG. 4 is a view showed on a display of the first embodiment.

When the user desires to utilize another application function, such as a "spreadsheet" function and a "presentation" function, the server 100 causes the display 200 to display information about a function of the other server 600 perceived by the server as well as information about a function that can be provided by the server, thereby prompting the user to select a function as shown in FIG. 4.

When the "spreadsheet" function provided by the server 600 is selected, the server 100 provides the display 200, the keyboard 300, and the mouse 400 managed as belonging to the same group with a transfer instruction for changing a connection target to the server 600.

Means for implementing the transfer instruction can use a scheme for notifying address information about a transfer target, such as an REFER method of an SIP (Session Initiation Protocol).

However, under such a scheme, the respective input/output devices individually make a new connection with the server 600, so that the group information about the input/output devices managed by the server 100 will be lost. As a result, there arises a necessity for managing grouping operation again through interactive operation performed between the user and the server 600 by use of a scheme, such as that described in connection with; for example, JP-A-2007-4656. Consequently, the user must repeatedly perform interactive operation for grouping the input/output devices every time a server that provides an application function is switched, which considerably degrades usability. The server of the present patent application solves such a problem.

Figure 1:
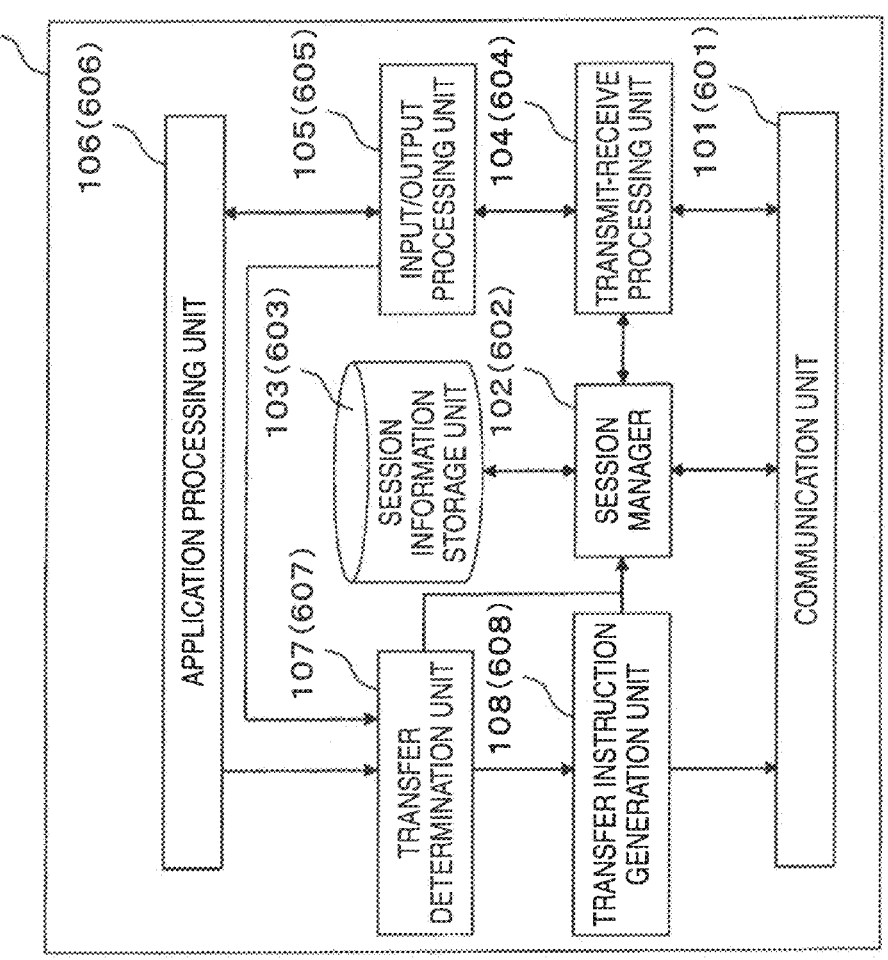
FIG. 1 is a block diagram showing the organization of a server of a first embodiment.

FIG. 1 is a block diagram showing the configuration of the server 100 of a first embodiment of the present invention. The configuration of the server 100 will be described hereinafter. The server 600 has a similar configuration too. In FIG. 1, parenthesized reference numerals suffixed to respective sections are reference numerals of respective sections of the server 600.

The server 100 has a communication unit 101; a session manager 102; a session information storage unit 103; a transmit-receive processing unit 104; an input/output processing unit 105; an application processing unit 106; a transfer determination unit 107; and a transfer instruction generation unit 108.

The communication unit 101 establishes communication with the input/output devices in compliance with wire communication, such as IEEE802.3 and FDDI (Fiber Distributed Data Interface), or radio communication, such as IEEE802.11 and Bluetooth (registered Trademark).

The session manager 102 manages, as communication session information, the state of a round of communication operations from establishment of a connection with an input/output device until termination of the connection and the state of an application. The communication session information is stored in a session information storage unit 103.

FIG. 5 shows an example communication session information table stored in the session information storage unit 103 of the server 100.

A "self-IP-address" in FIG. 5 designates an IP address of the server 100, A "self-port-number" is used for designating a final destination for a communication packet within the server.

A "device terminal IP address" and a "device terminal port number" are used for identifying and establishing communication with a connected input/output device on the other side.

A word "type" designates the type of a connected input/output device. The server 100 identifies the function of an input/output device by reference to a type.

A word "unique information" is set information unique to an input/output device. In addition to communication speed (a connection rate) of a communication unit belonging to the input/output device, a time interval (a display interval) from receipt of key operation until a display of the operation for the case of a keyboard, movement speed of a cursor (cursor speed) for the case of a mouse, and the like, are stored as unique information.

In the case of a display, image quality information, such as the number of displayable colors, the maximum resolution, a screen size, and the like, are stored as unique information. The screen size does not always need to be a screen size of an overall display. For example, when a display area available for the server 100 (where an application screen can be displayed) occupies a part of the display, positional information about the area is stored. For instance, the display has a 1024*768 screen size [the number of horizontal pixels is 1024, and the number of vertical pixels is 768], the display area is assumed to be a rectangular area, and coordinates (0, 0)

of a starting point of the rectangular area and coordinate (1023, 767) of an end point of the same are stored as unique information, whereby positional information can be specified.

A word "session identifier" is group identification information that is stored in association with information for distinguishing an input/output device after the server 100 has performed operation for grouping input/output devices. In the computing system of the present invention, grouping and generation and management of a session identifier are performed by the server 100 in order to reduce processing load on the input/output devices. In order to avoid collision of a session identifier with a session identifier of another group, it is preferable to generate a random numerical value and time information with the use of a hash function.

As mentioned above, an input/output device is stored in association with a session identifier serving as identification information about a group to which the input/output device belongs, whereby the session manager 102 can grasp, by reference to the session information storage unit 103, an output device (e.g., a display) to which an input result from a certain input device (e.g., a keyboard) is to be output. An application function provided by one server can be simultaneously utilized by a plurality of users and a plurality of input/output devices.

The transmit-receive processing unit 104 subjects a package from the input/output device received by the communication unit 101 to processing, such as elimination of communication control information and error correction, and transmits processed data to the input/output processing unit 105. When received transmission data from the input/output processing unit 105, the transmit-receive processing unit 104 generates a packet for transmitting data toward a target device acquired from the session manager 102 and transmits the thus-generated packet to the target device by way of the communication unit 101.

The input/output processing unit 105 performs processing for exchanging data with the application processing unit 106, such as conversion of a data format. For instance, key input data from the keyboard 300 are input to the application processing unit 106, or application screen data acquired from the application processing unit 106 are converted into an appropriate format for transmission to the display 200.

Application screen data are assumed to be screen data that are generated as a result of an application program being activated by the application processing unit 106 and that are for submitting a result of processing of the application to the user. The application screen data may also be taken as an uncompressed bitmap image, compressed by means of a compressed still image scheme, such as JPEG (Joint Photographic Experts Group), or compressed by a compressed moving picture scheme, such as BEG (Moving Picture Experts Group).

More specifically, the input/output processing unit 105 transmits only updated region of screen image by comparing the difference with the transmitted screen image generated by the application processing unit 106. The input/output processing unit 105 receives an updated portion of application screen data from the application processing unit 106 and adds coordinate information showing the location of the updated portion, to thus generate transmission data. In accordance with the state of a transmission channel, the thus-generated transmission data are subjected to signal processing, such as compression, and the thus-processed data are transmitted to the display 200 by way of the transmit-receive processing unit 104 and the communication unit 106.

The application processing unit 106 performs operation processing of an OS (Operating System) or an application program (application software) that runs on an OS. For instance, when an operation instruction is received from an input device connected by way of a network, application processing is performed so as to respond to the operation instruction.

At this time, when a change happens on a desktop screen of an application program, the application processing unit 106 transmits, to the input/output processing unit 105, information about an updated region of the application screen data. As mentioned above, the input/output processing unit 105 subjects the information to signal processing in accordance with the state of the transmission channel and transmits the thus-processed data to the display 200 by way of the transmit-receive processing unit 104 and the communication unit 106.

When received an operation instruction, such as switching of an application, from the user by way of the keyboard 300 or the mouse 400, the application processing unit 106 notifies the transfer determination unit 107 about the instruction in order to determine whether or not connection to another server is required in association with switching of the application.

The transfer determination unit 107 determines which server provides the application to be switched and a necessity for a connection with (a transfer to) another server (the server 600). Moreover, the transfer determination unit 107 determines an input/output device required to be transferred, by reference to the session manager 102.

When the server 600 to be connected and an input/output device to be provided with an instruction about a transfer to the server 600 are determined by the transfer determination unit 107, the transfer instruction generation unit 108 generates a message for instructing for establishing a connection with a new server 600 (a transfer instruction message) and transmits the thus-generated message to the input/output device by way of the communication unit 106.

At this time, the transfer instruction generation unit 108 also transmits information about a group to which the input/output device belongs, which is stored in the session information storage unit 103 (a session identifier), while the information is included in the transfer instruction message.

FIG. 6 is a view showing an example configuration of the transfer instruction message transmitted to the input/output device by the server 100.

In addition to including an "IP header," the transfer instruction message includes an "UDP (User Datagram Protocol)/TCP (Transmission Datagram Protocol) header." As a result of the header being included in the transfer instruction message, the transfer instruction message is finally delivered to the input/output device on the network.

The word "message type" designates identification information showing that a communication packet is a transfer instruction message.

The words "target IP address" and "target port number" designate an IP address and a port number of the server 600 that is a destination of transfer packet. The input/output device received the message can be connected to the server 600 that is the transfer target by means of the IP address and the port number.

The word "session identifier" designates identification information for identifying a group to which the input/output device serving as a destination for the transfer instruction message belongs. As mentioned above, the session identifier is stored in the session information storage unit 103 in association with the identification information about the input/output device at the time of grouping of the input/output device. On generating a transfer instruction message for the input/output device, the transfer instruction generation unit 108 reads, from the session information storage unit 103, the session identifier of the input/output device serving as a target and incorporates the read identifier into the transfer instruction message.

The word "unique information" designates unique information about a device stored in the session information storage unit 103. As mentioned above, the unique information is set information unique to an input/output device, such as movement speed of a mouse. For instance, when the user changed the movement speed of a mouse before establishment of a connection to another server, the latest information achieved after changing of the movement speed is stored in the session information storage unit 103. At the time of instruction of a connection, the unique information is incorporated into the transfer instruction message, whereby a newly-connected server can reflect the setting unique to the user, thereby enhancing the convenience of the user.

The configuration of the server 100 of the present invention has been mentioned above.

The configuration of an input/output device that receives the transfer instruction message transmitted by the server 100 and that makes a connection to another server 600 will now be described.

Figure 7:
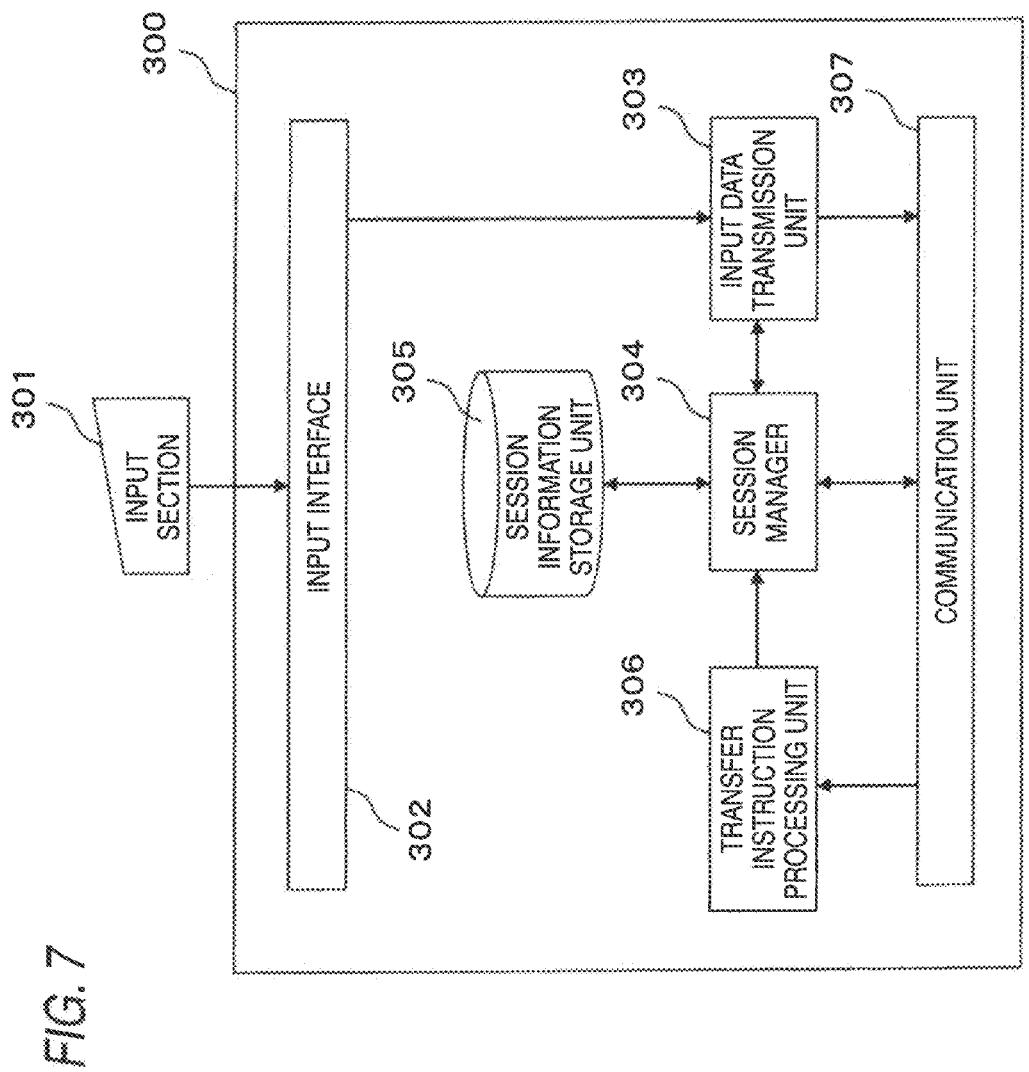
FIG. 7 is a block diagram showing the configuration of a keyboard of the first embodiment.
Figure 8:
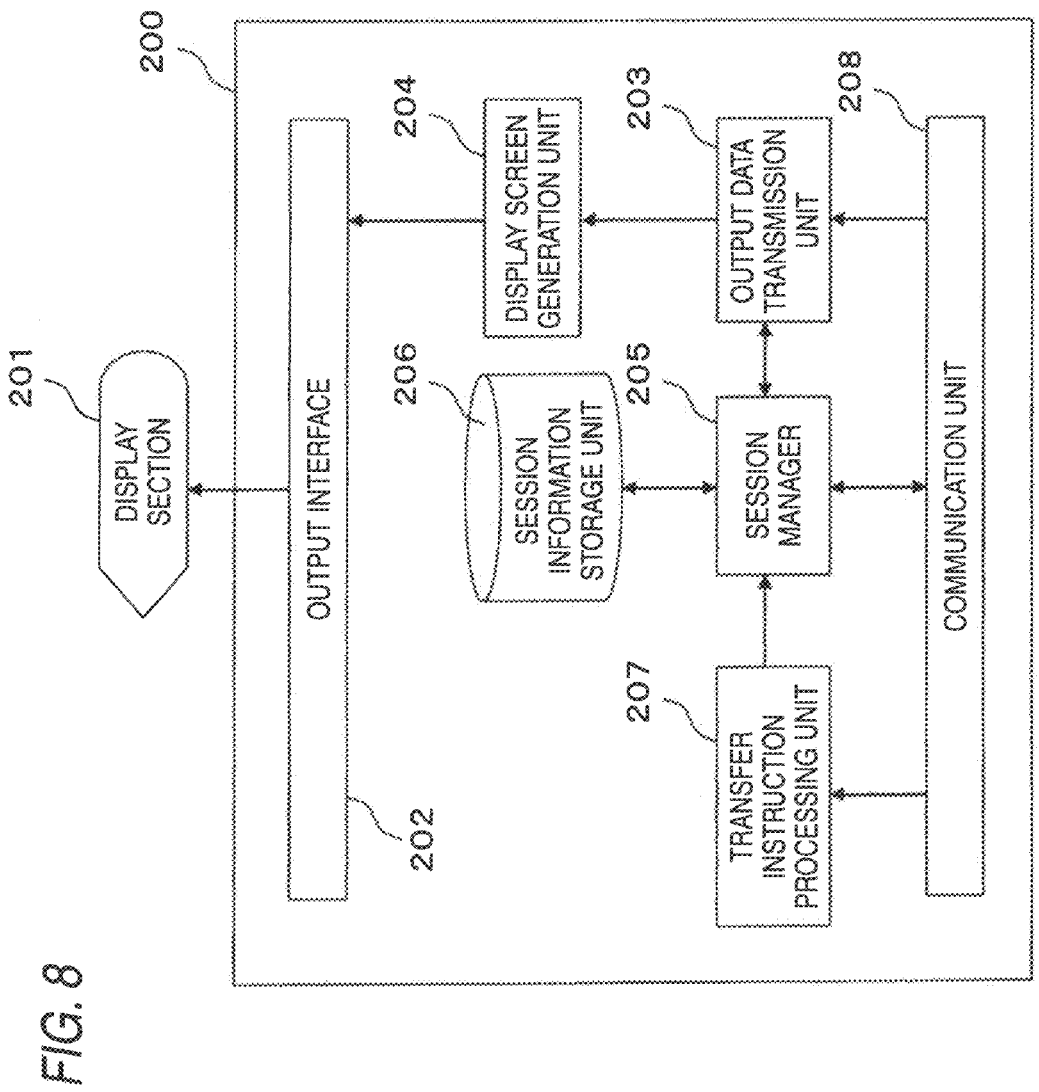
FIG. 8 is a block diagram showing the configuration of a display of the first embodiment.

FIGS. 7 and 8 are views showing a configuration of an input device that receives a data input by the user by way of a keyboard or a mouse, which is a terminal of the present invention, and a configuration of an output device that outputs data to the user, such as a display. FIG. 7 shows the configuration of the keyboard 300. The mouse 400 can also be implemented by means of the same configuration while differing from the keyboard only in terms of operation of the input section 301, the input interface 302, and the input data transmission unit 303.

As shown in FIG. 7, the keyboard 300 has an input section 301, an input interface 302, an input data transmission unit 303, a session manager 304, a session information storage unit 305, a transfer instruction processing unit 306, and a communication unit 307.

The input section 301 receives key operation performed by the user. The key operation input to the input section 301 is converted into an electrical signal by means of the input interface 302, and the electrical signal is transmitted as input data to the input data transmission unit 303.

After receiving the input data transmitted from the input interface 302 to encoding, the input data transmission unit 303 adds communication control information to the encoded data and transmits the input data to the server that is managed by the session manager 304 and remains in connection with the keyboard.

The session manager 304 manages, as communication session information, the state of a round of communication operations and the state of an application achieved from when the keyboard is connected with the server until when the connection is terminated. The communication session information is stored in the communication session information storage unit 305.

FIG. 9A shows an example of communication session information table stored in the session information storage unit 305 of the keyboard 300. Specification of respective items of the table shown in FIG. 9A are similar to those of items of the communication session information table of the server 100 shown in FIG. 5. However, in contrast with the communication session information table of the server 100, the communication session information table of the keyboard 300 does not have the item "session identifier" used for distinguishing a group to which the keyboard 300 belongs. As mentioned above, in the computing system of the present invention, the server 100 performs grouping and generation and management of a session identifier for reducing processing load on the input/output devices.

A table shown in FIG. 9B shows an example of communication session information table stored in the mouse 400 serving as an input device, and a table shown in FIG. 9C shows an example communication session information table stored in the session information storage unit of the display 200 to be descried later.

When received the transfer instruction message transmitted from the server 100, the transfer instruction processing unit 306 instructs the session manager 304 to terminate the connection with the server 100 and to make a new connection with the server 600, thereby establishing communication. At this time, the transfer instruction processing unit 306 notifies the session manager 304 about a session identifier included in the transfer instruction message.

When the transfer instruction processing unit 306 establishes new connection with the server 600, the session manager 304 incorporates the session identifier reported by the transfer instruction processing unit 306 into a message that is to be transmitted to the server 600 for establishing communication.

By means of the configuration, the keyboard 300 can transmit the information about the group managed by the server 100 to the server 600 that will be a new connection target.

Transmission and receipt of data performed by way of the network are carried out by way of the communication unit 307 as in the server 100. As mentioned previously, the communication unit 307 performs communication conforming to the wire communication standards, such as IEEE 802.3 and FDDI (Fiber Distributed Data Interface) or the radio communication standards, such as IEEE 802.11 and Bluetooth (Registered Trademark).

FIG. 8 is a view showing the organization of the display 200 acting as an output device.

As shown in FIG. 8, the display 200 has a display section 201, an output interface 202, an output data receiving unit 203, a display screen generation unit 204, a session manager 205, a session information storage unit 206, a transfer instruction processing unit 207, and a communication unit 208.

The output data receiving unit 203 receives, by way of the communication unit 208, application screen data from the server 100. The output data receiving unit 203 subjects the received data to processing, such as elimination of communication control information or error correction and transmits passed data to the display screen generation unit 204.

When the data transmitted from the output data receiving unit 203 are compressed, the screen generation unit 204 decompresses the data and displays the application screen data on the display section 201 by way of the output interface 202.

As mentioned above, when the application screen data transmitted from the server 100 are only data pertaining to an updated portion of the already-received application screen data, the display screen generation unit 204 acquires, from the received data, the data pertaining to the updated portion and coordinate information showing the position of the updated portion and updates a corresponding portion of the already-received application screen data by means of the received data, to thus generate the display screen.

Operation of the transfer instruction processing unit 207 of the display 200 is analogous to the operation of the transfer instruction processing unit 306 of the foregoing keyboard 300.

Operations of respective devices in the computing system of the present invention will now be described by reference to FIGS. 10 and 11.

As mentioned above, the server 100 and the server 600 are assumed to be detected by using the technique such as UPnP. The application function provided by another server is assumed to be stored in the session information storage unit 103 along with connection information about the server and managed by the session manager 102. The server 100 is assumed to be set, as an initial connection target to which a connection is to be made after power-up, in the display 200, the keyboard 300, and the mouse 400 which are disposed at the user side.

The input/output devices for which power is turned on (step S101) are connected to the server 100 set as an initial connection target, thereby establishing a communication session (step S102). At this time, the session manager 102 of the server 100 stores, in the session information storage unit 103, the information about the input/output devices with which the communication session is established. In this stage, however, grouping of the input/output devices is not yet completed. Hence, there is achieved a state where a session identifier is not stored in the communication session information table stored in the session information storage unit 103 of the server 100 (or a state where a default value is described).

Next, as mentioned previously, the server 100 practices grouping of the input/output devices through interactive operation performed between the server 100 and the user by way of the input/output devices.

By reference to the session information storage unit 103, the session manager 102 of the server 100 selects the display 200 serving as an output device; generates a screen for instructing performance of predetermined input operation by way of a keyboard; and sends the screen to the display 200 (steps S103 and S104).

Upon glance of the screen image on the display 200, the user performs operation compliant with the instruction by way of the keyboard 300 located at hand (step S105). The keyboard 300 transmits the input data to the server 100 which a communication session is established (step S106).

The session manager 102 of the server 100 can ascertain, from a response from the keyboard 300 in answer to the input instruction to the keyboard transmitted to the display 200, that the display 200 and the keyboard 300 are utilized by a single user. The session manager 102 generates a session identifier for uniquely identifying a group and stores a value of the thus-generated session identifier in items of the session identifiers of the session information storage table for the display 200 and the keyboard 300 stored in the session information storage unit 103 (step S107).

Grouping of the display 200 and the keyboard 300 is implemented through such processing.

The session manager 102 further performs similar processing in connection with the mouse, thereby grouping the mouse 400 (steps S108 through S111).

After completion of grouping of the input/output devices, the server 100 transmits the application screen data generated by the application processing unit 106 to the display 200 (step S112) and processes inputs from the thus-grouped keyboard 300 and the grouped mouse 400 by means of the transmit-receive processing unit 104 and the input/output processing unit 105, thereby providing the user with an application function.

Figure 11:
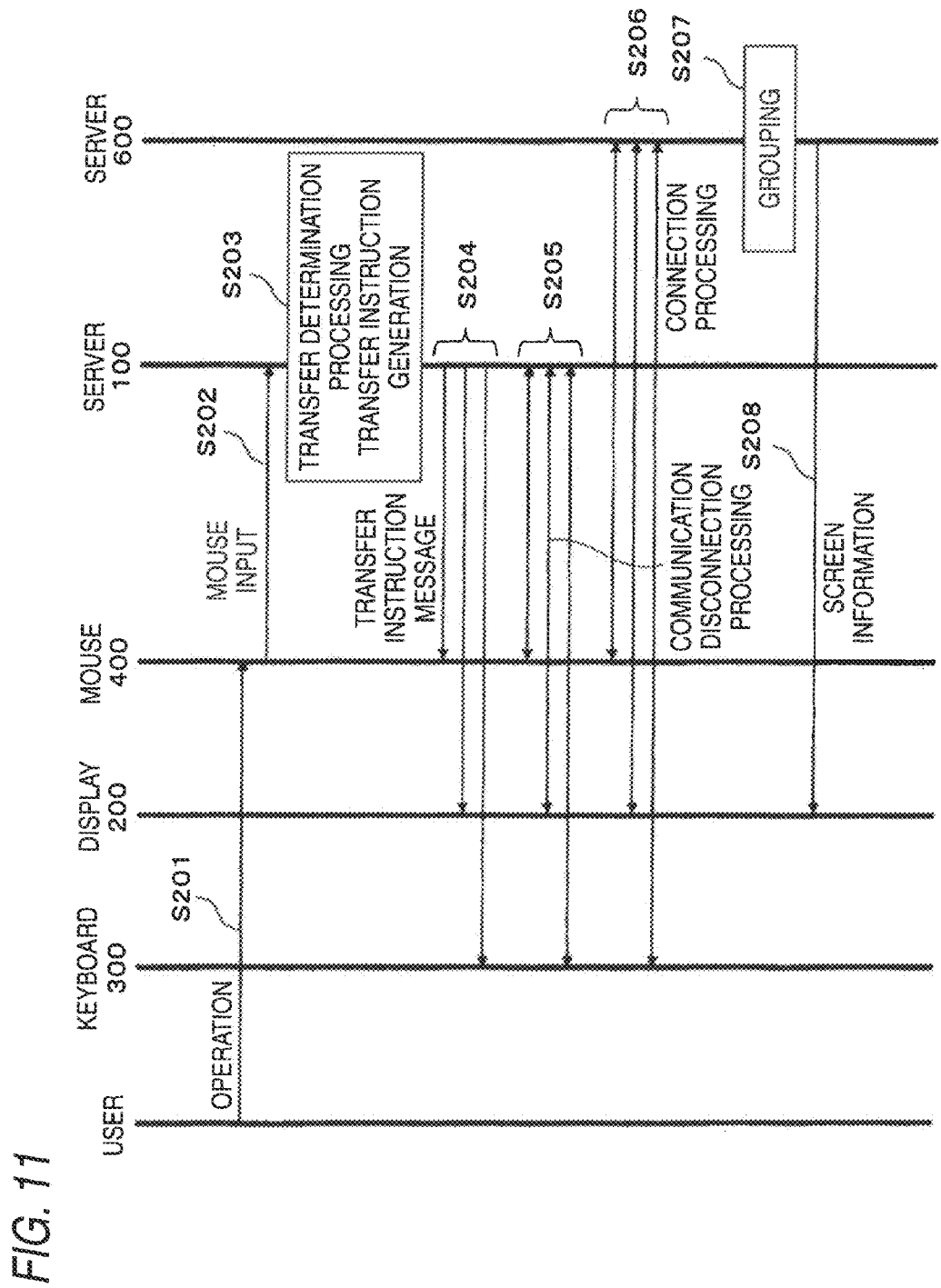
FIG. 11 is a sequence diagram showing operation of the computing system of the first embodiment.

FIG. 11 shows operations of respective devices performed when making of a reconnection from the server 100 to the server 600 is required as a result of the user selected an application program provided by the server 600 in the middle of the connection with the server 100. Selection of the application function provided by the server 600 is performed as a result of the application function ("spreadsheet" in the embodiment) provided by the server 600 being selected by means of the mouse 400 on a screen, such that shown in FIG. 4, transmitted from the server 100 to the display 200.

Upon receipt of an input from the mouse 400, the transfer determination unit 107 of the server 100 receives an acknowledgement from the application processing unit 106 and determines whether or not a connection to another server is required. The server (the server 600 in the embodiment shown in FIG. 11) that becomes a transfer target is determined by reference to the session manager 102. An input/output device transferred to the server 60 is determined by reference to the session identifier stored in the session information storage unit 103 (step S203).

Specifically, as shown in FIG. 5, the display 200, the keyboard 300, and the mouse 400 are stored as input/output devices belonging to a single group (i.e., having a single session identifier) in the communication session information table stored in the session information storage unit 103. Hence, the transfer determination unit 107 determines the input/output devices as input/output devices to be transferred.

The transfer instruction generation unit 108 of the server 100 next generates a transfer instruction message for instructing a connection to the server 600 and transmits the message to these input/output devices (steps S203 and S204). As mentioned above, the transfer instruction message includes a session identifier of a group to which the input/output devices belong.

The transfer instruction processing unit 207 of the display 200 received the transfer instruction message instructs the session manager to disconnect communication with the server 100 (step S205). In the following descriptions, for the sake of simplicity, operations of respective sections of the display 200 will be described. The keyboard 300 and the mouse 400 also operate in the same fashion.

The transfer instruction processing unit 207 of the display 200 instructs the session manager 205 to make a connection with the server 600. The session manager 207 establishes a communication session to the server 600 (step S206).

At this time, the transfer instruction processing unit 207 notifies the session manger 205 about the session identifier included in the transfer instruction message. On establishing a communication session with the server 600, the session manger 205 incorporates the session identifier reported by the transfer instruction processing unit 207 into the message to be transmitted to the server 600 for establishing communication.

Thus, the display 200 can transmit information about the group managed by the server 100 to the server 600 that is to become a new connection peer.

The session manager 602 of the server 600 established a communication session among the display 200, the keyboard 300, and the mouse 400 stores into the session information storage unit 603 information about the input/output devices for which the communication session has been established.

At this time, since the session identifiers for identifying the group to which the input/output devices belong have already been reported by the respective input/output devices, the session manger 602 stores the session identifiers also into the session information storage unit 603. Thus, by use of the session identifiers reported by the input/output devices, the server 600 can group the input/output devices without involvement of performance of new interactive operation with the input/output devices (step S207).

The server 600 determines the group of the input/output devices by use of the session identifiers stored in the session information storage unit 603 and enables provision of an application function by way of the display 200, the keyboard 300, and the mouse 400 (step S208).

Thus, in the computing system of the first embodiment of the present invention, the server 100 performs grouping of input/output devices (the display 200, the keyboard 300, and the mouse 400) connected to the server 100 by way of the network and stores the respective input/output devices in association with identification information (a session identifier) about a group to which the input/output devices belong. When making of a connection to another server (the server 600) in association with utilization of another application function is required, a connection (transfer) instruction is transmitted to the respective input/output devices of the server 100. At this time, identification information about the group to which the input/output devices belong stored in the server 100 is also transmitted. As a result of the input/output devices acknowledging the server 600 serving as a connection target about the identification information about the group, the server 600 can readily perform grouping of the input/output devices. Therefore, the user can perform switching among applications without involvement of degradation of usability.

In the foregoing embodiment all of the grouped input/output devices are connected to the new server 600 in association with switching among the application functions. However, only some of the input/output devices of the group may also be connected to the new server 600.

For instance, consideration is given to a case where the user is listening to music played back by the server 100 by means of a speaker that is disposed at the user side and that is connected to the server 100 by way of the network while utilizing a "word processing" function provided by the server 100. At this time, when the user desires to switch the application to "spreadsheet" provided by the server 600 and keep listening to music, it is desirable that the input/output devices except the speaker be connected to the server 600 and that the speaker still remain connected to the server 100.

Figure 12:
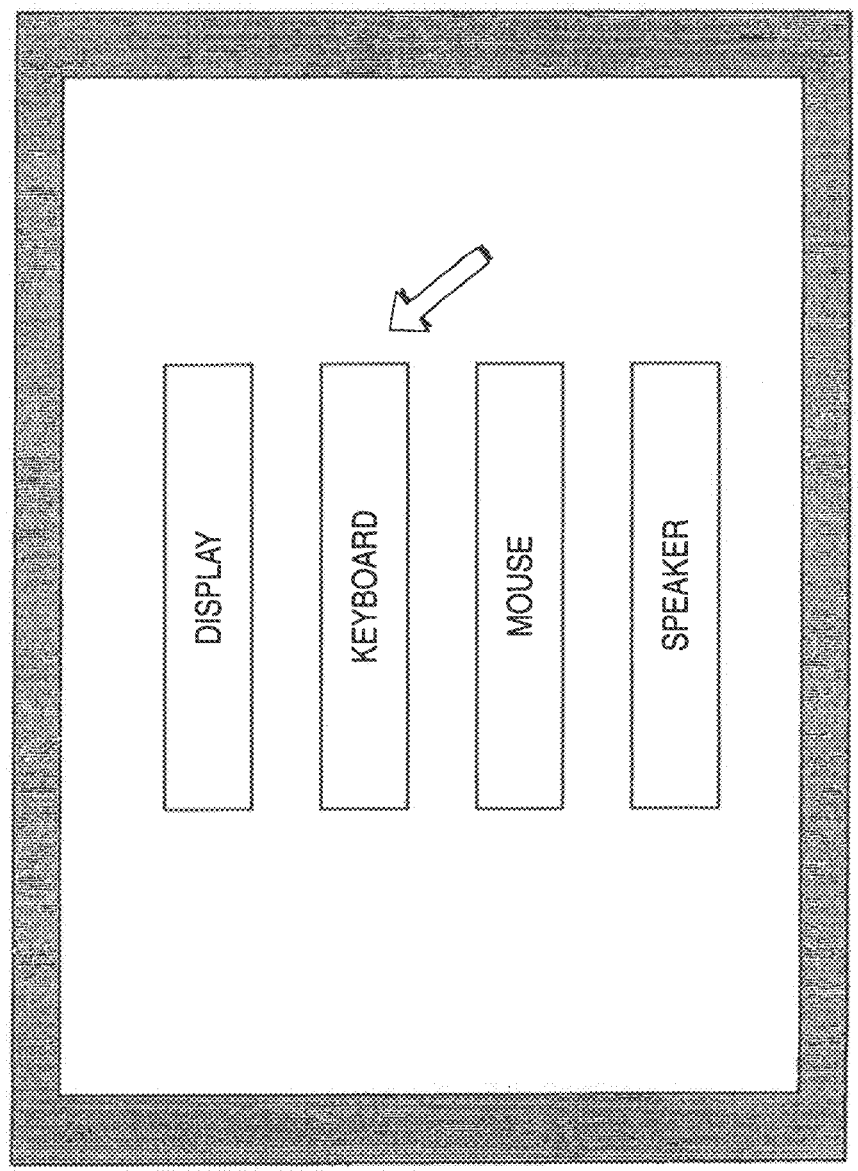
FIG. 12 is a view showed on a display of the display of the first embodiment.

In order to realize such a desire, for instance, when music is being played back, the display 200 can also be caused to display a screen for prompting selection of input/output devices which are objects of switching, such as that shown in FIG. 12, at the time of switching of the application function, to thus perform connection of only the selected input/output devices.

The transfer instruction generation unit 108 of the server 100 generates the transfer instruction message solely to the input/output devices selected by the user and transmits the thus-generated message, and the session manger 102 maintains the communication session of an unselected input/output device (the speaker in the embodiment). As a result, only some of input/output devices can be connected to the new server 600, as required.

The foregoing server can also be implemented as by use of, for instance, a general-purpose computer as basic hardware. Specifically, respective units constituting the computer can be implemented by causing a processor incorporated in the computer to execute a program. At this time, the server may also be implemented by previously installing the program in the computer, by storing the program in a storage medium, such as CD-ROM, or by distributing the program over a network and installing the program into a computer, as necessary. Further, storage means like a session information storage unit can be implemented by utilization of memory built in or provided outside the computer, a hard disk drive, a storage medium, such as a CD-R, a CD-RW, DVD-RAM, a DVD-R, and the like, as necessary.

Second Embodiment

In a second embodiment there is described an exemplification of a computing system achieved when the application function provided by the server 100 and the application function provided by the server 600 are simultaneously used by the display 200 of the first embodiment.

The foregoing first embodiment describes the exemplification in which the user switches a server to be connected in order to utilize the "spreadsheet" function provided by the server 600 in the middle of utilization of the "word processing" function provided by the server 100. In the second embodiment, there is described a mode of practice of the invention achieved when the display area of the display 200 is split and when a connection to the server 600 is added while the connection to the server 100 is maintained and while the application screen of the "word processing" function provided by the server 100 is still displayed in a portion of the drawn region of the display 200, thereby utilizing the "spreadsheet" function as well.

The configuration of the server 100 and the configuration of the server 600 of the second embodiment are identical with the configuration of its counterpart server 100 and the configuration of its counterpart server 600 of the first embodiment shown in FIG. 1. However, in order to realize operation of the second embodiment, the respective units perform new operations in addition to the operations described in connection with the first embodiment.

Figure 13A:
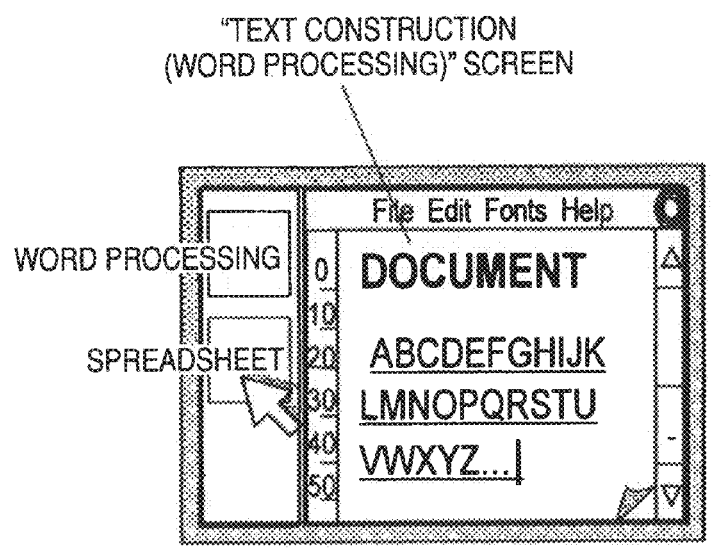
FIGS. 13A and B are views showed on displays of the display of the second embodiment.
Figure 13B:
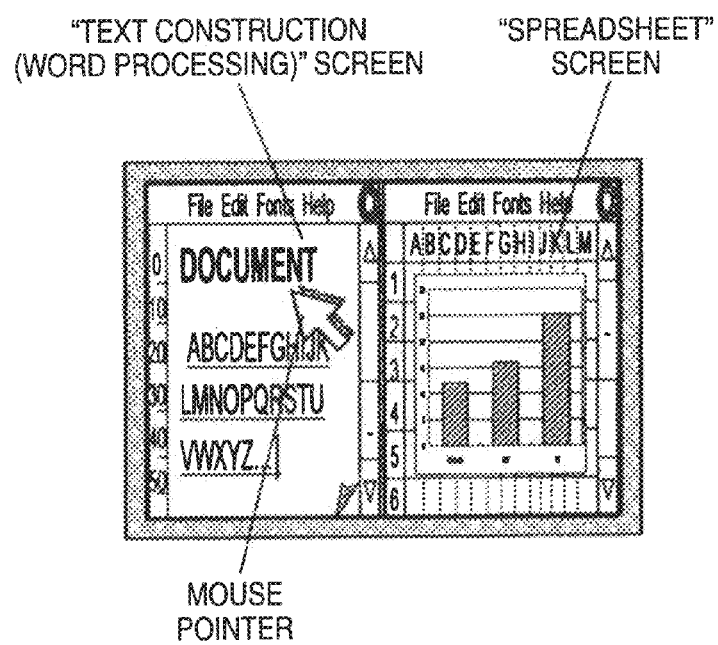

FIG. 13 is a view showing a screen image of an application program showed on the display 200 before and after addition of a server of the second embodiment. FIG. 13A shows an example display appearing when a connection is made to the server 100 and when only the "word processing" function is utilized. FIG. 13B shows an example display appearing when another connection is made to the server 600 and when both the "word processing" function and a "spreadsheet" function are simultaneously utilized. In FIG. 13A, a screen for selecting the "word processing" function and the "spreadsheet" function is generated by the server 100. In FIG. 13B, the screen of "word processing" is generated by the server 100 and corresponds to a screen image of an application program transmitted to the display 200. The "spreadsheet" screen is generated by the server 600 and corresponds to an application screen transmitted to the display 200.

As shown in FIG. 13B, when the drawn area of the display 200 is split and when application screens transmitted from a plurality of servers are displayed, designation of an active application is assumed to be performed by moving a mouse pointer over one screen image of an application program. In an exemplification shown in FIG. 13B, since the mouse pointer is situated on the "word processing" screen, the "word processing" function is an active application.

The display area of the display 200 will be described by reference to FIG. 14. In an exemplification shown in FIG. 14, the display 200 is an output device having a maximum screen size of 1024 pixels in the horizontal (lateral) direction and 768 pixels in the vertical (longitudinal) direction. The screen image of an application generated by the server 100 is displayed within a rectangular area defined by the coordinate positions (0, 0) to (511, 767). The application screen generated by the server 600 is displayed within a rectangular area defined by the coordinate positions (512, 0) to (1023, 767). The coordinate positions designate the positions of the pixels achieved in both the horizontal and vertical directions.

Figure 14:
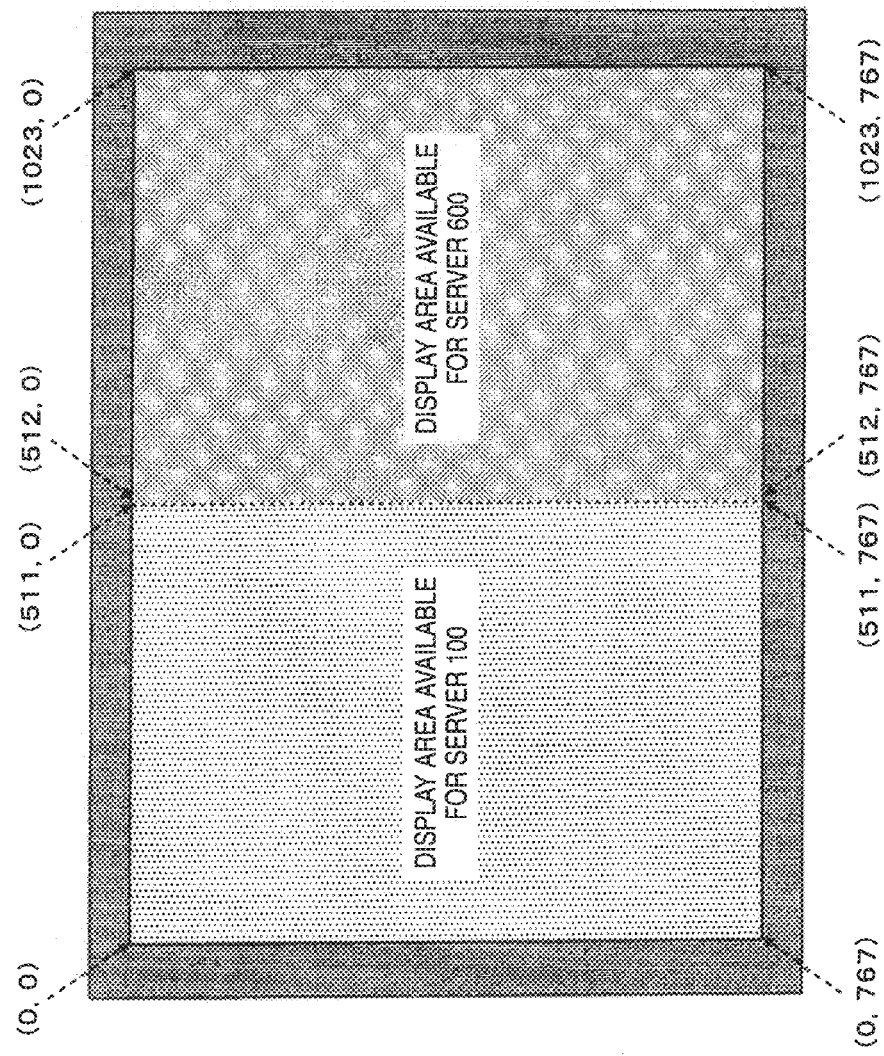
FIG. 14 is a view showed on a display of the display of the second embodiment.

In FIG. 14, the display area for the server 100 is drawn on the left side from the user's point of view, and the display area for the server 600 is drawn on the right side from the user's point of view. However, settings of the display area are not limited to such exemplifications, and the display areas may also be reversed, or the display area may also be split vertically.

FIG. 15A shows an example communication session information table of the session information storage unit 206 of the display 200 achieved when the display area of the display 200 is split into a plurality of sub-areas. As shown in FIG. 15A, when the display area is split into a plurality of sub-areas, there is stored information about communication sessions with the respective servers because the display 200 is connected to the server 100 and the server 600. In FIG. 15A, display areas available for the respective servers are stored as "unique information" in association with IP address, or the like, of the servers. Specifically, a display area for the server 100 (an IP address: 10.0.0.1) is a rectangular area from a coordinate position (0, 0) to a coordinate position (511, 767) and stored as (0, 0, 511, 767). In the meantime, a display area for the server 600 (an IP address: 10.0.0.2) is a rectangular area from a coordinate position (512, 0) to a coordinate position (1023, 767) and stored as (512, 0, 1023, 767).

These pieces of unique information about the display 200 are managed, regardless of whether the pieces of information relate to the server 100 or the server 600, in an analogous fashion by a communication session information table, such as that shown in FIG. 5. The server 100 and the server 600 can also notify each other about the display area available for the other server and store the information in the communication session information table. However, in a situation where the server that has become a transfer target of the input/output devices is subjected to additional transfer processing, it is conceived that an increase in the scale of a system stemming from an increase in the number of servers leads to complication of processing for notifying information about display areas, to thus increase load. Accordingly, the following descriptions are provided on the assumption that each server stores only its available display area and that display areas available for the other servers are not stored.

FIG. 15B shows a communication session information table of the mouse 400 achieved when the display area of the display 200 is split into a plurality of sub-areas. As mentioned above, in the present embodiment, an active application is an application appearing in the display area where the mouse pointer is displayed. The essential requirement for the mouse 400 is to establish communication solely with the server that provides the active application. Hence, the server stored in the communication session information table of the mouse 400 is only one (the server 100 in the exemplification).

Figure 16:
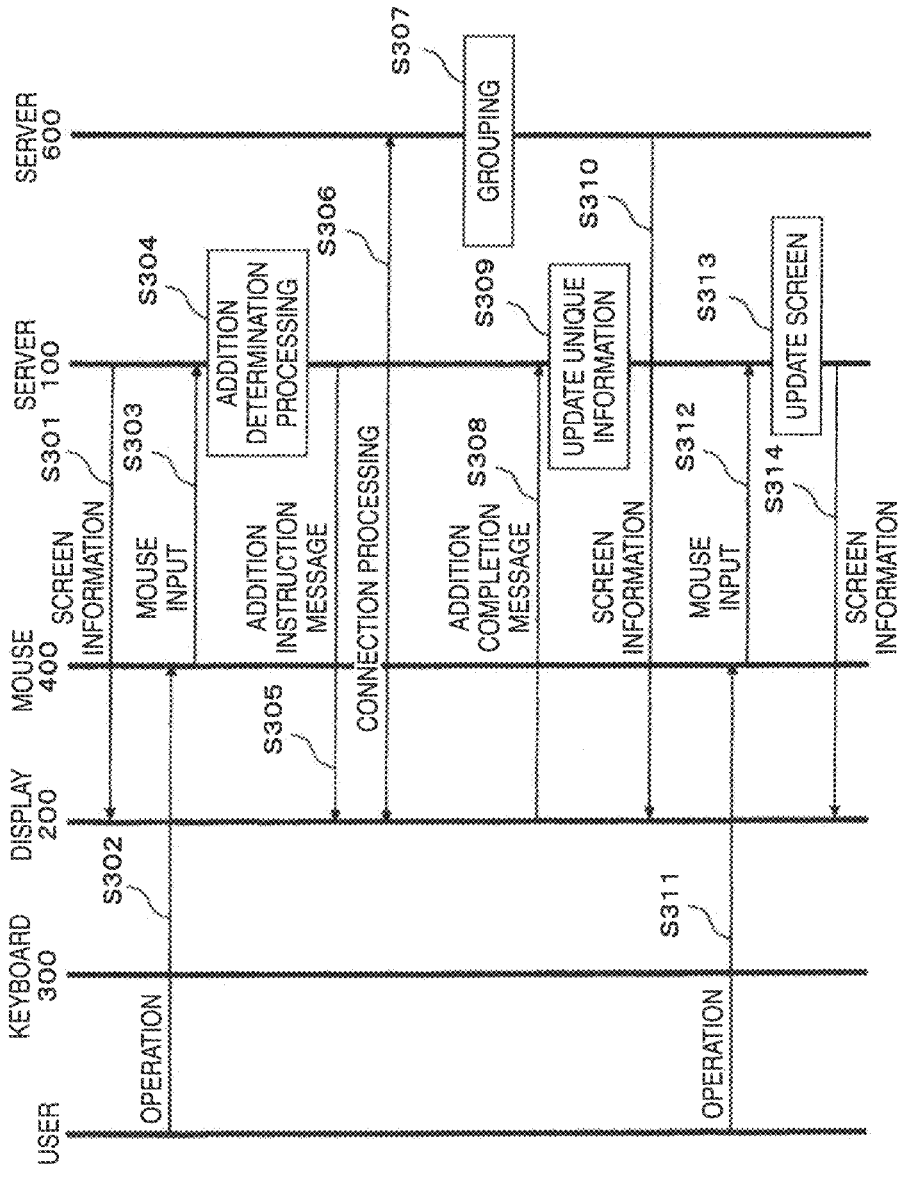
FIG. 16 is a sequence diagram showing operation of the computing system of the second embodiment.

Next, operation of the computing system of the second embodiment of the present invention will be described by reference to FIG. 16. FIG. 16 shows an example achieved when the user makes a (additional) connection to the server 600 in order to utilize the "spreadsheet" function provided by the server 600 in the middle of utilization of the "word processing" function provided by the server 100.

In FIG. 16, established communication sessions assumed to exist between the server 100 and the display 200, the keyboard 300, and the mouse 400, and the respective input/output devices and session managers of the servers are assumed to manage the communication sessions. Further, the server 100 is assumed to have completed grouping of the input/output devices, and communication session information tables, such as those shown in FIGS. 5 and 9, are assumed to be stored in the session information storage units of the server 100, the display 200, the keyboard 300, and the mouse 400.

Initiation of utilization of the "spreadsheet" function provided by the server 600 can be implemented by transmitting and displaying an application screen, by means of which an available application is provided to the user, from the server 100 to the display 200 as shown in; for instance, FIG. 13A, and prompting the user to select the application (step S301).

The user notifies the server 100 about initiation of utilization of the "spreadsheet" function by clicking a button (icon) of the "spreadsheet" on the application screen displayed on the display 200, by use of the mouse 400 (steps S302 and S303).

In the server 100, an input from the mouse 400 is processed by the application processing unit 106. The transfer determination unit 107 determines, from a processing result, whether or not an additional connection to another server is necessary (step S304). In FIG. 13A, upon receipt of an input to a button area for selecting the "spreadsheet" function, the server 100 performs input processing by way of the application processing unit 106, and the transfer determination unit 107 determines that the display 200 requires addition of the server 600.

When the transfer determination unit 107 determines a necessity for a connection to another server (the server 600 in the exemplification), the transfer instruction generation unit 108 generates a message for instructing making of a connection to the server 600 (an addition instruction message) and transmits the thus-generated message to the display 200 (a step S305). As mentioned above, in the present embodiment, an active application is an application located in a display area where the mouse pointer is located. Input/output devices other than the display 200 do not need to make a connection with the server 600 unless the mouse pointer is moved to a display area assigned to the server 600 for which a new connection is to be made. Therefore, an instruction message to add another service is transmitted solely to the display 200 that updates information about a display area.

FIG. 17 is a view showing an example configuration of an instruction message to add another service transmitted to the display 200 from the server 100. As shown in FIG. 17, the addition instruction message includes information about a group (a session identifier) to which the display 200 belongs stored in the session information storage unit 103. Respective items included in the message are essentially the same as those of the transfer instruction message shown in FIG. 6, but the type of the message is "addition instruction."

Upon receipt of an addition instruction message transmitted from the server 100, the transfer instruction processing unit 207 of the display 200 instructs the session manager 205 to make a connection with the server 600. The session manager 207 establishes a communication session with the server 600 (step S306). When the addition instruction message is received, processing for terminating the connection with the server 100 is not performed in contrast with the case where a transfer instruction message is received.

At this time, the transfer instruction processing unit 207 notifies the session manager 205 about a session identifier included in the addition instruction message. On establishing a communication session with the server 600, the session manger 205 incorporates a session identifier reported by the transfer instruction processing unit 207 into the message to be transmitted to the server 600 for establishing communication. As a result, the display 200 can transmit the information about the group managed by the server 100 to the server 600 that is to become a new connection target.

In order to ensure a display area for displaying an application screen of the server 600 that is to be newly, additionally connected, the session manager 205 splits its own display area and transmits as unique information to the server 600 a display area available for the server 600. For instance, when a display area is split as shown in FIG. 14, data showing a rectangular area defined by (512, 0, 1023, 767) are transmitted as unique information for displaying a display area available for the server 600. Alternatively, a display area (0, 0, 511, 767) available for the server 100 may also be reported as unique information, to thus determine a display area available for the server 600.

The server 600 to be additionally connected and information about a display area available for the server 600 are stored in the communication session information table of the session information storage unit 206 as shown in FIG. 15.

In the meantime, the session manager 602 of the server 600 establishes a communication session with the display 200 and stores the session identifier of the display 200 into the communication session information table of the session information storage unit 603 in association with the identification information about the display 200 (step S307).

After establishing a communication session with the server 600, the session manger 205 of the display 200 generates an addition completion message and transmits the message to the server 100 (step S308).

FIG. 18 is an example configuration of an addition completion message transmitted from the display 200 to the server 100.

Unique information about the addition completion message shown in FIG. 18 includes a display area available for the server 100. For instance, when the display area is split as shown in FIG. 14, data showing a rectangular area defined by (0, 0, 511, 767) as a display area available for the sever 100 are transmitted as unique information.

Upon receipt of the addition completion message, the session manager 102 of the server 100 updates the communication session information table stored in the session information storage unit 103 (step S309). Subsequently, the application screen transmitted from the server 100 to the display 200 is stored in the communication session information table and transmitted to the display area available for the server 100.

The above relates to operation performed when the display 200 newly establishes a communication session with the server 600.

After establishment of a communication session between the display 200 and the server 600, the server 600 transmits an application screen to the display 200 (step S310). However, so long as the active application is an application provided by the server 100, the keyboard 300 and the mouse 400 maintain a connection with the server 100 (from steps S311 to S314).

Next, there will be described operation performed when switching to the active application is performed while the display area of the display 200 is split and when the application screen from the server 100 and the application screen form the server 600 are displayed in the respective sub-areas. The following descriptions provide explanations about a case where switching of an active application is performed by moving the mouse pointer to an application screen desired to be made active through operation of the mouse 400.

Figure 19:
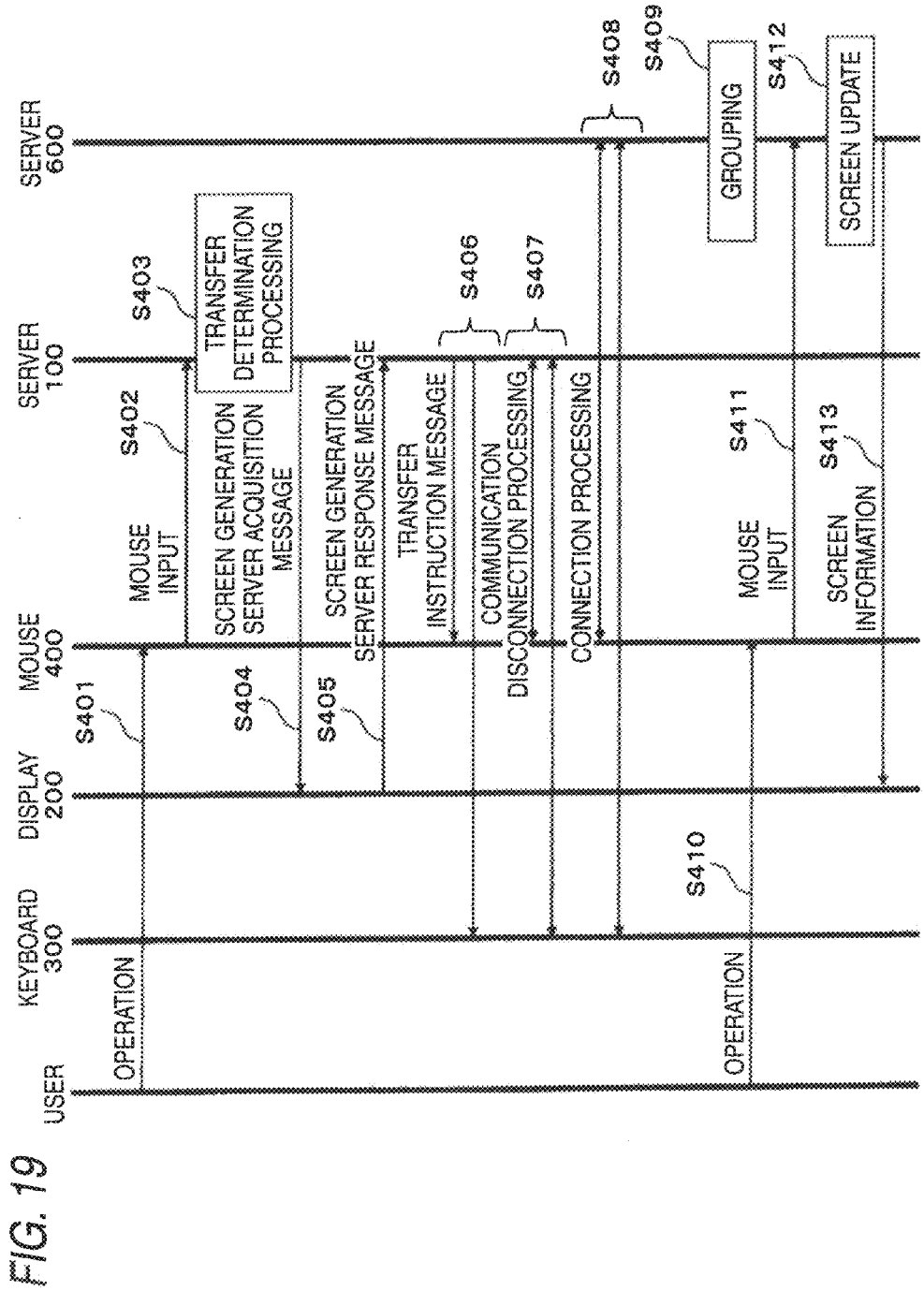
FIG. 19 is a sequence diagram showing operation of the computing system of the second embodiment.

FIG. 19 shows operations of respective devices performed when the application provided by the server 100 is switched to an application provided by the server 600.

As shown in FIG. 20, the mouse pointer is moved from the display area available for the server 100 to the display area available for the server 600 by means of user's operation of the mouse 400 (step S401).

Upon receipt of an input from the user, the mouse 400 transmits an input instruction (input data) to the server 100 (step S402). Input data include information showing the position of the mouse pointer achieved after movement. Specifically, the input data are expressed by coordinate position information like (a horizontal position, a vertical position).

Upon receipt of input data from the mouse 400, the transfer determination unit 107 of the server 100 determines, by reference to the communication session information table of the session information storage unit 103, whether the received position of the mouse pointer achieved after movement is located within or outside the display area available for the server 100 in the display area of the display 200 (step S403).

When the transfer determination unit 107 determines that the position of the mouse pointer achieved after movement is located outside the display area available for the server 100 in the display area of the display 200, the session manager 102 determines that the active application has been switched to an application provided by another server and inquires of the display 200 about information about the server providing the application. Upon receipt of input information showing that the mouse pointer is located outside the display area available for the terminal 100, the input/output processing unit 104 desirably notifies the application processing unit 106 about processing for erasing the mouse display without performing input processing for the application processing unit 106.

Specifically, the session manager 102 generates a message (a server information acquisition message), such as that shown in FIG. 21A, and transmits the thus-generated information to the display 200. The server information acquisition message is a message that includes the position of the mouse pointer achieved after movement as "coordinate position information" and that makes an inquiry about a server utilizing the coordinate position.

Upon receipt of the server information acquisition message, the session manager 205 of the display 200 reads the server utilizing the coordinate position included in the message, by reference to the communication session information table stored in the session information storage unit 206. A message (a server information answer message) including an IP address and a port number of the thus-read server, such as that shown in FIG. 21B, is generated, and the thus-generated message is transmitted to the server 100 (step S405).

Upon receipt of the server information answer message from the display 200, the server 100 recognizes the server (the server 600 in the exemplification) that provides an application to be newly active.

The transfer instruction generation unit 108 of the server 100 generates a message for instructing a transfer to the server 600 to which the input/output devices are to be newly connected, and transmits the thus-generated message to the mouse 400. Further, at this time, the transfer instruction message is transmitted to the keyboard 300 belonging to the same group as that of the mouse 400 (i.e., having the same session identifier), as well (step S406). Since a communication session is already present between the display 200 and the server 600, the transfer instruction message does not need to be transferred.

The transfer instruction does not need to be provided to all of the input/output devices belonging to the same group to which the mouse 400 belongs. As described in connection with the first embodiment when there is an output device, such as the speaker outputting music transmitted from the server 100, the connection between the speaker and the server 100 may also be maintained.

The transfer instruction message transmitted from the server 100 to the keyboard 300 and the mouse 400 includes the session identifier of the group to which the keyboard 300 and the mouse 400 belong.

Moreover, the transfer instruction message transmitted from the server 100 to the mouse 400 may also include, as unique information, the nature of movement of the mouse pointer starting from the display area of the server 100 and performed across the display area of the server 600. Movement of the mouse pointer can be expressed by time-series data about positional coordinates of the mouse pointer. Thus, information about movement of the mouse pointer transmitted from the mouse 400 to the server 100 before the mouse 400 is connected to the server 600 is transmitted to the server 600. After establishment of a communication session between the mouse 400 and the server 600, movement of the mouse is reflected on the application screen of the server 600. As a result, a display of the mouse pointer can be implemented as if the mouse pointer were smoothly moved over the display area.

The transfer instruction processing unit 207 of the keyboard 300 and the transfer instruction processing unit 207 of the mouse 400 disconnect the communication sessions with the server 100 in accordance with the transfer instruction message transmitted from the server 100 (step S407) and establish communication sessions with the server 600 (step S408).

At this time, the session managers of the keyboard 300 and the mouse 400 also notify the server 600 about the session identifier included in the transfer instruction message transmitted from the server 100.

The server 600 stores the session identifier transmitted from the keyboard 300 and the mouse 400 into the session information storage unit 603 along with the information about the keyboard 300 and the mouse 400. As a result, the server 600 can determine a group to which the respective input/output devices belong by use of the session identifier (step S409). Therefore, the server 600 can group the input/output devices can be implemented without involvement of new interactive operation performed between the input/output devices and also prevent deterioration of usability.

After establishment of the communication sessions between the server 600 and the respective input/output devices, an input operation by the user to the mouse 400 (step S410), for example, is transmitted from the mouse 400 to the server 600 (step S411). An application screen is generated by the server 600 (step S412), and the screen is subsequently transmitted to the display 200 (step S413).

As mentioned above, in the computing system of the second embodiment of the present invention, even when the application function provided by the server 100 and the application function provided by the server 600 are simultaneously utilized, grouping operation stemming from switching among servers can be performed quickly, so that deterioration of usability can be prevented.

The present invention is not limited directly to the embodiments and can be embodied in a practical stage by modification of constituent elements within the scope of gist of the invention. Further, various inventions can be created by appropriate combinations of a plurality of constituent elements described in the embodiments. For instance, some of the constituent elements may also be deleted from all of the constituent elements described in the embodiments. Moreover, constituent elements of different embodiments may also be combined as appropriate.

FIG. 1
106 APPLICATION PROCESSING UNIT
107 TRANSFER DETERMINATION UNIT
108 TRANSFER INSTRUCTION GENERATION UNIT
103 SESSION INFORMATION STORAGE UNIT
102 SESSION MANAGER
105 INPUT/OUTPUT PROCESSING UNIT
104 TRANSMIT-RECEIVE PROCESSING UNIT
101 COMMUNICATION UNIT
FIG. 2
100 SERVER
A NETWORK
500 WIRELESS ACCESS UNIT
200 DISPLAY
300 KEYBOARD
400 MOUSE
FIG. 3
100 SERVER A
600 SERVER B
A NETWORK
500 WIRELESS ACCESS UNIT
200 DISPLAY
300 KEYBOARD
400 MOUSE
FIG. 4
A WORD PROCESSING
B SPREADSHEET
C PRESENTATION
FIG. 5
A: SELF-IP-ADDRESS
B: SELF-PORT-NUMBER
C: IP ADDRESS OF DEVICE TERMINAL
D: PORT NUMBER OF DEVICE TERMINAL
E: TYPE
F: UNIQUE INFORMATION
G: SESSION IDENTIFIER
H: KEYBOARD
I: CONNECTION SPEED
J: DISPLAY INTERVAL
K: CONNECTION SPEED
L: CURSOR SPEED
M: CONNECTION SPEED
N: IMAGE QUALITY
O: RESOLUTION
P: SCREEN SIZE
FIG. 6
A: IP HEADER
B: UDP/TCP HEADER
C: MESSAGE TYPE (TRANSFER INSTRUCTION)
D: IP ADDRESS OF TRANSFER TARGET
E: PORT NUMBER OF TRANSFER TARGET
F: SESSION IDENTIFIER
G: UNIQUE INFORMATION
FIG. 7
301 INPUT SECTION
302 INPUT INTERFACE
305 SESSION INFORMATION STORAGE UNIT
306 TRANSFER INSTRUCTION PROCESSING UNIT
304 SESSION MANAGER
303 INPUT DATA TRANSMISSION UNIT
307 COMMUNICATION UNIT.
FIG. 8
201 DISPLAY SECTION
202 OUTPUT INTERFACE
204 DISPLAY SCREEN GENERATION UNIT
206 SESSION INFORMATION STORAGE UNIT
207 TRANSFER INSTRUCTION PROCESSING UNIT
205 SESSION MANAGER
203 OUTPUT DATA TRANSMISSION UNIT
208 COMMUNICATION UNIT
FIG. 9A

SELF-IP-ADDRESS, SELF-PORT-NUMBER, IP ADDRESS OF SERVER, PORT NUMBER OF SERVER, TYPE, UNIQUE INFORMATION
KEYBOARD, CONNECTION SPEED, DISPLAY INTERVAL
FIG. 9B
SELF-IP-ADDRESS, SELF-PORT-NUMBER, IP ADDRESS OF SERVER, PORT NUMBER OF SERVER, TYPE, UNIQUE INFORMATION
MOUSE, CONNECTION SPEED, CURSOR SPEED
FIG. 9C
SELF-IP-ADDRESS, SELF-PORT-NUMBER, IP ADDRESS OF SERVER, PORT NUMBER OF SERVER, TYPE, UNIQUE INFORMATION
DISPLAY, CONNECTION SPEED, IMAGE QUALITY, RESOLUTION, SCREEN SIZE
FIG. 10
A: USER
300 KEYBOARD
200 DISPLAY
400 MOUSE
100 SERVER
600 SERVER
S101 POWER-UP
S102 INITIAL CONNECTION PROCESSING
S103 GENERATE SCREEN
S104 SCREEN INFORMATION
S105 OPERATION
S106 KEYBOARD INPUT
S107 UPDATE KEYBOARD GROUPING SCREEN
S108 SCREEN INFORMATION
S109 OPERATION
S110 MOUSE INPUT
S111 UPDATE MOUSE GROUPING SCREEN
S112 SCREEN INFORMATION
S113 OPERATION
S114 KEYBOARD
FIG. 11
A: USER
300 KEYBOARD
200 DISPLAY
400 MOUSE
100 SERVER
600 SERVER
S201 OPERATION
S202 MOUSE INPUT
S203 TRANSFER DETERMINATION PROCESSING
B: TRANSFER INSTRUCTION GENERATION
S204 TRANSFER INSTRUCTION MESSAGE
S205 COMMUNICATION DISCONNECTION PROCESSING
S206 CONNECTION PROCESSING
S207 GROUPING
S208 SCREEN INFORMATION
FIG. 12
A: DISPLAY
B: KEYBOARD
C: MOUSE
D: SPEAKER
FIG. 13A
"TEXT CONSTRUCTION (WORD PROCESSING)" SCREEN
FIG. 13B
"TEXT CONSTRUCTION (WORD PROCESSING)" SCREEN "SPREADSHEET" SCREEN
FIG. 14
DISPLAY AREA AVAILABLE FOR SERVER 100
DISPLAY AREA AVAILABLE FOR SERVER 600
FIG. 15A
SELF-IP-ADDRESS, SELF-PORT-NUMBER, IP ADDRESS OF SERVER, PORT NUMBER OF SERVER, TYPE, UNIQUE INFORMATION
DISPLAY, SCREEN SIZE
DISPLAY, SCREEN SIZE
FIG. 15B
SELF-IP-ADDRESS, SELF-PORT-NUMBER, IP ADDRESS OF SERVER, PORT NUMBER OF SERVER, TYPE, UNIQUE INFORMATION
MOUSE, CONNECTION SPEED, CURSOR SPEED
FIG. 16
A: USER
300 KEYBOARD
200 DISPLAY
400 MOUSE
100 SERVER
600 SERVER
S301 SCREEN INFORMATION
S302 OPERATION
S303 MOUSE INPUT
S304 ADDITION DETERMINATION PROCESSING
S305 ADDITION INSTRUCTION MESSAGE
S306 CONNECTION PROCESSING
S307 GROUPING
S308 ADDITION COMPLETION MESSAGE
S309 UPDATE UNIQUE INFORMATION
S310 SCREEN INFORMATION
S311 OPERATION
S312 MOUSE INPUT
S313 UPDATE SCREEN
S314 SCREEN INFORMATION
FIG. 17
A: IP HEADER
B: UDP/TCP HEADER
C: MESSAGE TYPE (ADDITION INSTRUCTION)
D: IP ADDRESS OF ADDITION TARGET
E: PORT NUMBER OF ADDITION TARGET
F: SESSION IDENTIFIER
G: UNIQUE INFORMATION
FIG. 18
A: IP HEADER
B: UDP/TCP HEADER
C: MESSAGE TYPE (ADDITION COMPLETION)
D: UNIQUE INFORMATION
FIG. 19
A: USER
300 KEYBOARD
200 DISPLAY
400 MOUSE
100 SERVER
600 SERVER
S401 OPERATION
S402 MOUSE INPUT
S403 TRANSFER DETERMINATION PROCESSING
S404 SCREEN GENERATION SERVER ACQUISITION MESSAGE
S405 SCREEN GENERATION SERVER RESPONSE MESSAGE
S406 TRANSFER INSTRUCTION MESSAGE
S407 COMMUNICATION DISCONNECTION PROCESSING
S408 CONNECTION PROCESSING
S409 GROUPING
S410 OPERATION
S411 MOUSE INPUT

S412 SCREEN UPDATE
S413 SCREEN INFORMATION
FIG. 20
DISPLAY AREA AVAILABLE FOR SERVER 100
DISPLAY AREA AVAILABLE FOR SERVER 600
FIG. 21A
IP HEADER, UDP/TCP HEADER, MESSAGE TYPE (SERVER ACQUISITION, INFORMATION), COORDINATE POSITION INFORMATION
FIG. 21B
IP HEADER, UDP/TCP HEADER, MESSAGE TYPE (SERVER INFORMATION ANSWER), IP ADDRESS, PORT NUMBER

What is claimed is:

1. A server apparatus for establishing communication with a plurality of input/output devices via a network, the apparatus comprising:
  a memory configured to store information of the input/output devices in association with information of at least one group to which the respective input/output devices belong; and
  circuitry configured to
    establish and manage a communication session with each of the input/output devices based on the information of the at least one group via the network;
    execute an application program;
    receive from the input/output devices an operation instruction for the application program and to transmit to the input/output devices a processing result of the application program responsive to the operation instruction while referring to the information of the at least one group;
    determine whether achievement of the processing result requires connection of the input/output devices to an external server; and
    generate, in response to determining that the processing result cannot be achieved by the server apparatus and requires connection of the input/output devices with the external server, a message for instructing the input/output devices to connect to the external server, wherein the message includes information of the at least one group.

2. A terminal apparatus for establishing communication with servers via a network, the apparatus comprising:
  circuitry configured to
    manage a communication session with a first server via the network;
    transmit an operation instruction to the application program that runs on the first server;
    receive, in response to a determination by the first server that the processing result cannot be achieved by the first server, a message requiring the connection of the terminal device with a second server and including group information about a group to which the terminal belongs; and
    establish a communication session with the second server via the network by providing the group information included in the message to the second server.

3. The apparatus according to claim 1, wherein, when the circuitry receives information of the group from the input/output devices at the time of establishment of the communication session with the input/output devices, the circuitry stores the information of the input/output devices in the memory in association with the group.

4. The apparatus according to claim 1, wherein
  the input/output devices include a display device, and
  the memory stores information of an available display area from the apparatus in association with the display device.

5. The apparatus according to claim 4, wherein
  the input/output devices include an input device,
  the display device includes an image display area that includes the available display area and an outside area other than the available display area, the outside area being available from the external server,
  the circuitry determines whether an inputted instruction transmitted from the input device instructs a data input to the outside area, and
  the circuitry generates and transmits the message when the circuitry determines that the inputted instruction instructs the data input to the outside area.

6. A communication control method of a server apparatus for establishing communication with a plurality of input/output devices via a network and for running an application program, the method comprising:
  establishing and managing a communication session with each of the input/output devices;
  storing information of the input/output devices in association with information of at least one group to which the respective input/output devices belong;
  establishing and managing a communication session with each of the input/output devices based on the information of the at least one group via the network;
  receiving from the input/output devices an operation instruction for the application program;
  transmitting to the input/output devices a processing result of the application program responsive to the operation instruction;
  determining whether achievement of the processing result requires connection of the input/output devices to an external server; and
  generating, in response to determining that the processing result cannot be achieved by the server apparatus and requires connection of the input/output devices with the external server, a message for instructing the input/output devices to connect to the external server, wherein the message includes information of the group.

* * * * *